(12) United States Patent
Okuno

(10) Patent No.: US 11,769,221 B2
(45) Date of Patent: Sep. 26, 2023

(54) LEARNING APPARATUS, INFERRING APPARATUS, COMPUTER PROGRAM, COMPUTER SYSTEM, INFERRING METHOD, AND LEARNING METHOD

(71) Applicant: AXELL CORPORATION, Tokyo (JP)

(72) Inventor: Shuji Okuno, Nara (JP)

(73) Assignee: AXELL CORPORATION, Tokyo (JP)

( * ) Notice: Subject to any disclaimer, the term of this patent is extended or adjusted under 35 U.S.C. 154(b) by 482 days.

(21) Appl. No.: 17/247,063

(22) Filed: Nov. 25, 2020

(65) Prior Publication Data

US 2021/0287046 A1  Sep. 16, 2021

(30) Foreign Application Priority Data

Mar. 12, 2020 (JP) .................................. 2020-042563
Jun. 22, 2020 (JP) .................................. 2020-106917

(51) Int. Cl.
| | |
|---|---|
| G06T 1/20 | (2006.01) |
| G06N 3/08 | (2023.01) |
| G06T 3/40 | (2006.01) |
| G06V 10/82 | (2022.01) |
| G06V 10/26 | (2022.01) |
| G06V 20/70 | (2022.01) |
| G06N 5/04 | (2023.01) |
| G06F 18/214 | (2023.01) |

(52) U.S. Cl.
CPC ............ *G06T 1/20* (2013.01); *G06F 18/2148* (2023.01); *G06N 3/08* (2013.01); *G06N 5/04* (2013.01); *G06T 3/4053* (2013.01); *G06V 10/26* (2022.01); *G06V 10/82* (2022.01); *G06V 20/70* (2022.01)

(58) Field of Classification Search
CPC ..... G06T 1/20; G06T 3/4053; G06F 18/2148; G06N 3/08; G06N 5/04; G06N 3/045; G06V 10/26; G06V 10/82; G06V 20/70
See application file for complete search history.

(56) References Cited

U.S. PATENT DOCUMENTS

| | | | |
|---|---|---|---|
| 2018/0068426 A1 | 3/2018 | Matsunaga | |
| 2021/0365725 A1* | 11/2021 | Ellison | ................... G06T 3/4038 |
| 2022/0141455 A1* | 5/2022 | Cricri | ................... H04N 19/176 |
| | | | 375/240.02 |

FOREIGN PATENT DOCUMENTS

| | | |
|---|---|---|
| JP | 2018-038789 A | 3/2018 |
| JP | 2020-027557 A | 2/2020 |

\* cited by examiner

*Primary Examiner* — Asghar H Bilgrami
(74) *Attorney, Agent, or Firm* — MASUVALLEY & PARTNERS; Peter R. Martinez

(57) ABSTRACT

To provide a learning apparatus and an inferring apparatus that can prevent problems such that a computation amount increases, efficiency of a learning process decreases, and an inferring result does not have high accuracy.

A learning apparatus and an inferring apparatus include a predictable area determining unit that determines whether target data has a predictable area in which an inferring result of an inferring process can be easily predicted. In the learning apparatus and the inferring apparatus, predetermined data processing is performed on a data area that is determined to be a predictable area, data required to infer an area that is not a predictable area is output to a machine learning model, and data processing is performed in an average time shorter than that of the inferring process.

14 Claims, 13 Drawing Sheets

LEARNING APPARATUS, INFERRING APPARATUS, COMPUTER PROGRAM, COMPUTER SYSTEM, INFERRING METHOD, AND LEARNING METHOD

RELATED APPLICATIONS

This application claims benefit of and priority to prior Japanese Patent Application No. 2020-042563, filed on Mar. 12, 2020, and Japanese Patent Application No. 2020-106917, filed on Jun. 22, 2020, the entire contents of which are incorporated herein by reference in their entireties.

FIELD

The present invention relates to a learning apparatus and an inferring apparatus using a machine learning model, and particularly relates to a learning apparatus and an inferring apparatus using a machine learning model for image processing.

BACKGROUND

Conventionally, a method for generating a learned model according to a data processing method by machine learning has been known. According to this method, a learned model by which data processing can be performed with respect to arbitrary data is generated by providing a data set that becomes training data to a computer program and learning a parameter of the program.

For example, in processing of "an input image (training data)→a learning program→an output image (training data)" using machine learning, a parameter of the learning program is calculated so that an error between the input image and the output image becomes smallest, to generate a "learned model". By inferring an output image from an input image in such a manner of "an input image (arbitrary data: for example, a low-resolution image)→a learned model→an output image (inferred data: for example, a high-resolution image)", by using the "learned model", an output image can be generated.

In recent years, of machine learning, machine learning using a neural network has been applied to many fields. Particularly, in the fields of image recognition and speech recognition, deep learning that uses the neural network in a multi-layer structure is exhibiting high recognition accuracy. In the multi-layered deep learning, image processing using a convolutional neural network (CNN) that uses a convolutional layer for extracting an input feature and a pooling layer plural times has been performed.

As image processing using the neural network, there are a super-resolution processor that generates a high resolution signal (for example, see Japanese Patent Application Laid-open No. 2020-27557), and a diagnostic support system that performs highly accurate diagnostic support by facilitating understanding of a difference in a disorder area (for example, see Japanese Patent Application Laid-open No. 2018-38789).

CITATION LIST

Patent Literatures

Patent Literature 1: Japanese Patent Application Laid-open No. 2020-27557
Patent Literature 2: Japanese Patent Application Laid-open No. 2018-38789

In data processing using the neural network, target data is input to a machine learning model. For example, in image processing, image data to be used in the machine learning model is expressed as a group of pixels laid out for each coordinate, and a pixel value (for example, three values of color information RGB) is added to each pixel. In the machine learning model, all the pixel values held by the target image data are input to an input neuron to perform the machine learning.

However, the image data may include an area in which there is a little change before and after an inferring process for machine learning such as a monochrome area or an area hardly having an edge component (an area having only a few changes), or an area that can be generated by a simple process, that is, an inferring result can be easily predicted (hereinafter, "predictable area"). If characteristics of the image data are ignored and all pieces of image data including the predictable area described above are equally input to the machine learning model, such problems occur that a computation amount increases, efficiency of a learning process decreases, and an inferring result does not have high accuracy.

Even in the image processing method described in Japanese Patent Application Laid-open No. 2018-38789, arithmetic processing taking into consideration a predictable area of input image data has not been disclosed.

The present invention has been achieved in view of the problems described above, and an object of the present invention is to provide a learning apparatus and an inferring apparatus that can prevent any of such problems that a computation amount increases, efficiency of a learning process decreases, and an inferring result does not have high accuracy, in data processing by machine learning using a convolutional neural network.

SUMMARY OF THE INVENTION

In order to achieve the above object, the present invention is an inferring apparatus that performs a predetermined inferring process with respect to data, in which a value with respect to a one-dimensional or two-or-more dimensional space is represented as a discrete value at a sample point in the space, by using a machine learning model, the inferring apparatus comprising: an input unit that receives an input of target data; a predictable area determining unit that determines whether target data input to the input unit has a predictable area in which an inferring result of the inferring process can be easily predicted; a machine learning model to which data is input from the input unit; an inferring process executing unit that performs the predetermined inferring process with respect to the target data by using the machine learning model; and a predicted data generating unit that performs predetermined data processing with respect to a data area, which is determined to be the predictable area, wherein the inferring process executing unit outputs data required for inferring an area, which is not a predictable area to the machine learning model, and the data processing is performed in an average time shorter than that of the inferring process.

The inferring apparatus according to the present invention performs a predetermined inferring process with respect to data, in which a value with respect to a one-dimensional or two-or-more dimensional space is represented as a discrete value at a sample point in the space, by using a machine learning model. The inferring apparatus includes the input unit that receives an input of target data, the predictable area determining unit that determines whether target data input to the input unit has a predictable area in which an inferring result of the inferring process can be easily predicted, the machine learning model to which data is input from the input unit, and the inferring process executing unit that performs a predetermined inferring process with respect to the target data by using the machine learning model. The inferring process executing unit outputs data required for inferring an area, which is not a predictable area, to the machine learning model. According to this configuration, the inferring apparatus according to the invention of the present application can prevent such problems that a computation amount increases, efficiency of a learning process decreases, and an inferring result does not have high accuracy, in data processing by machine learning.

DESCRIPTION OF EMBODIMENTS

First Embodiment

An image processing apparatus according to a first embodiment of the present invention is described with reference to FIG. 1 to FIG. 5. Target data in the present invention is data representing a value with respect to a one-dimensional or two-or-more dimensional space as a discrete value at a sample point in the space, and is not limited to image data. However, in the following embodiments, image data is described as a typical example. The image processing apparatus according to the first embodiment exerts a function as at least one of a learning apparatus that learns a set value in a machine learning model based on predetermined image data for learning such as image data and an inferring apparatus that performs a predetermined inferring process with respect to target image data by using a machine learning model.

Figure 1:
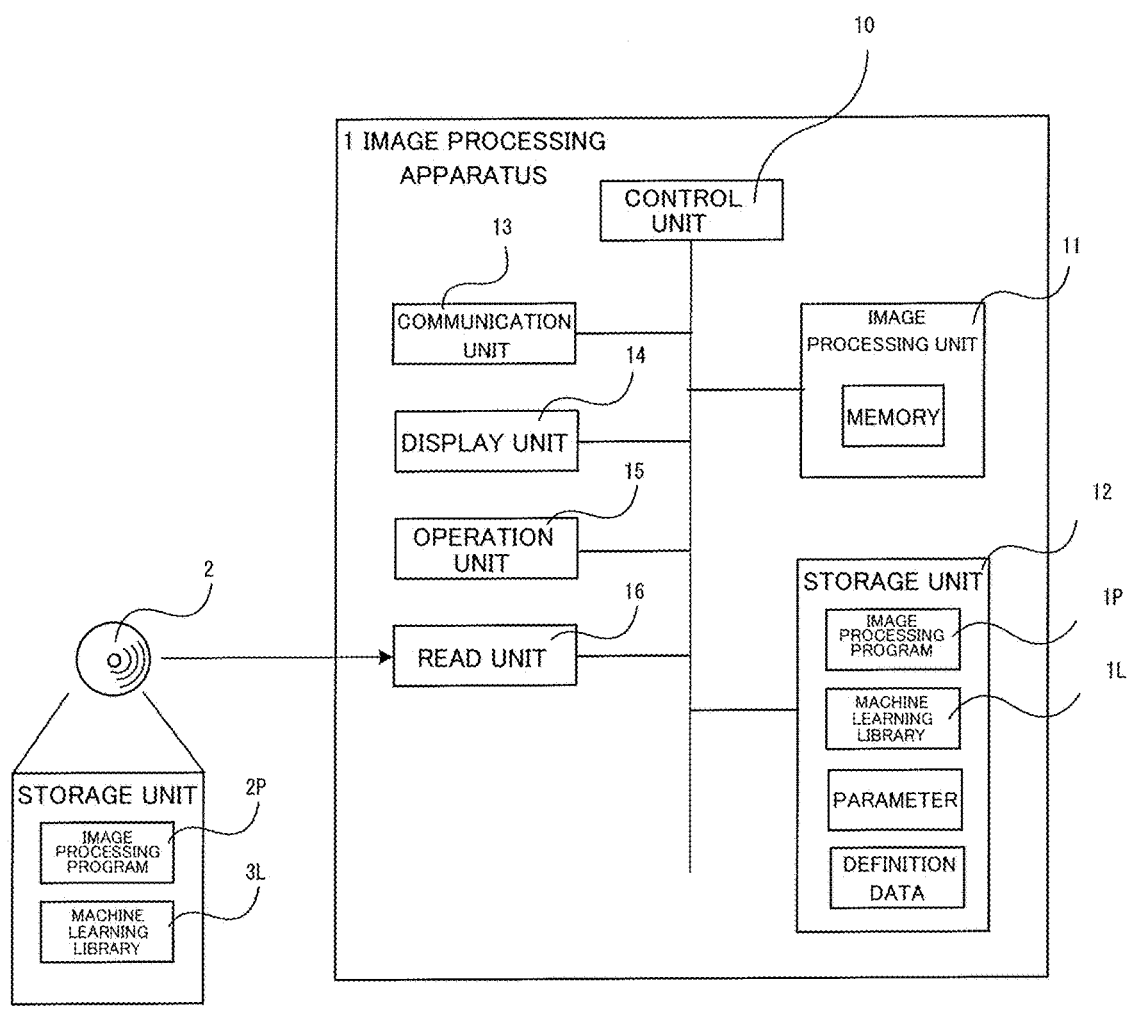
FIG. 1 is a block diagram illustrating a configuration of an image processing apparatus according to a first embodiment of the present invention.

First, respective processing units provided in an image processing apparatus 1 are described with reference to FIG. 1. The image processing apparatus 1 includes, as illustrated in FIG. 1, a control unit 10, an image processing unit 11, a storage unit 12, a communication unit 13, a display unit 14, an operation unit 15, and a read unit 16. The image processing apparatus 1 and operations in the image processing apparatus 1 are described below as one server computer. However, a configuration may be employed in which the image processing is performed by a plurality of computers in a distributed manner.

The control unit 10 controls component parts of the apparatus by using a processor such as a CPU and a memory to realize various functions. The image processing unit 11 performs image processing in response to a control instruction from the control unit 10 by using a processor such as a GPU or a dedicated circuit and a memory. The control unit 10 and the image processing unit 11 may be configured as one piece of hardware (SoC: System on a Chip) in which a processor such as a CPU or a GPU, a memory, and further, the storage unit 12 and the communication unit 13 are integrated.

As the storage unit 12, a hard disk or a flash memory is used. The storage unit 12 stores therein an image processing program 1P and a machine learning library 1L that exerts a function as a machine learning model (for example, a CNN). The storage unit 12 also stores therein definition data that defines the machine learning model, and parameters including a set value and the like in a learned machine learning model.

The communication unit 13 is a communication module that realizes communication connection to a communication network such as the Internet. The communication unit 13 uses a network card, a wireless communication device, or a carrier communication module.

The display unit 14 uses a liquid crystal panel, an organic EL (Electro Luminescence) display, or the like. The display unit 14 can display an image by the processing in the image processing unit 11 according to an instruction of the control unit 10.

The operation unit 15 includes a user interface such as a keyboard or a mouse. A physical button provided in a casing may be used. A software button or the like displayed on the display unit 14 may be used. The operation unit 15 notifies the control unit 10 of operation information of a user.

The read unit 16 can read an image processing program 2P and a machine learning library 3L stored in a recording medium 2 such as an optical disk, for example, by using a disk drive. The image processing program 1P and the machine learning library 1L stored in the storage unit 12 may be obtained by replicating the image processing program 2P and the machine learning library 3L read by the read unit 16 from the recording medium 2 by the control unit 10.

Next, an image processing function of the image processing apparatus 1 is described with reference to FIG. 2. The control unit 10 of the image processing apparatus 1 includes a learning process executing unit 101 and an inferring process executing unit 102. The learning process executing unit 101 functions as a machine learning model (a machine learning engine) based on the machine learning library 1L, definition data, and parameter information stored in the storage unit 12. That is, the learning process executing unit 101 uses a machine learning model to be learned to perform a process of learning a set value (a parameter or the like) in the machine learning model to be learned, based on image data for learning.

The inferring process executing unit 102 performs image processing based on the image processing program 1P stored in the storage unit 12. That is, the inferring process executing unit 102 uses a machine learning model to perform a predetermined inferring process with respect to the input target image data (target data). Further, the inferring process executing unit 102 also exerts a function as an image processing executing unit that inputs image data being input data to an input unit 111, based on a user operation using the operation unit 15.

In the first embodiment, the input unit 111 of the image processing unit 111 receives an input of image data for learning or target image data to be inferred. A predictable area determining unit 111a provided in the input unit 111 determines whether the target image data input to the input unit 111 (that is, the image data for learning or target image data to be inferred) has a predictable area in which an inferring result of an inferring process can be easily predicted. When the predictable area determining unit 111a determines that the target image data has a predictable area, the inferring process executing unit 102 (and the learning process executing unit 101) outputs data required for inferring (learning) an area, which is not the predictable area, to a machine learning model 112. Specifically, the inferring process executing unit 102 sorts and outputs image data in such a manner that image data in which all or at least a part of the predictable area is skipped is output to the machine learning model 112, and image data of the predictable area (image data other than the image data input to the machine learning model 112) is output to an output unit 113.

In the present embodiment, the predictable area determining unit 111a determines at least a part of the area having the same sample value continuous in the target data (image data) as a predictable area, and includes a monochrome area determining unit 111b and a block dividing unit 111c. The monochrome area determining unit 111b determines all the monochrome area continuous in the target image data or at least a part of the inside of the monochrome area as a predictable area. For example, the monochrome area determining unit 111b determines an area continuous with the same sample value as a predictable area based on pixel color information (such as RGB values) of the target image data. In the case of 8-bit expression, a predictable area may be determined by targeting only a specific color, such as an area in which perfect black (0, 0, 0) or perfect white (255, 255, 255) in RGB continues. Further, of the continuous area, for example, only an area inside thereof by several pixels may be determined as a predictable area. Regarding a range of the area, an area in which the same value continues (is adjacent to each other) by a predetermined number or more may be determined in a unit of a block of an arbitrary horizontal and vertical size, or when the target image data is divided into blocks, determination may be performed in a unit of a block.

Particularly, when the machine learning model is the CNN, pixels around a pixel to be processed may be referred to in the convolutional processing process. Therefore, the monochrome area determining unit 111b determines at least a part of an area inside of a monochrome area continuous in the target image data as a predictable area. That is, the monochrome area determining unit 111b determines the inside of the monochrome area, excluding pixels in the monochrome area to be referred to at the time of convolutionally processing the pixel to be processed by the CNN, as a predictable area. Accordingly, it can be prevented that an error occurs between a predicted value of the predictable area and an output of the machine learning model to generate noise at a boundary of a determination area. Here, the inside means an area on the monochrome area side away from all the pixels at the boundary by the number of arbitrary horizontal and vertical pixels or more. Similarly, with regard to the area other than the predictable area, the predictable area may be referred to in the machine learning model. Further, other than this, a boundary portion of the predictable area may be appropriately adjusted by taking a reference range in the convolution processing into consideration.

The block dividing unit 111c divides the image data input to the input unit 111 into areas. When the image data is expressed by color information of for example, 1920×1080 pixels, the block dividing unit 111c may divide the image data into, for example, areas of 128×128 pixels (one block) (if the pixels are not exactly divisible, the pixels may be divided by a maximum block that does not exceed the size of one block). Block division may be performed so that blocks overlap on each other, or block division may be performed after the periphery of an image is expanded (padding) for the arbitrary number of pixels with the same pixels as those at the boundary of the image. The predictable area determining unit 111a may determine a predictable area in a unit of a block divided by the block dividing unit 111c. Determination in the unit of a block may be performed, taking into consideration the reference range in the convolution processing as described above. Further, a block including a predictable area may be partly mixed in the blocks by setting the predictable area in a free form and outputting only image data to be output to the machine learning model in a unit of a block.

The machine learning model 112 performs optimization processing (for example, resolution enhancement or noise removal) of image data based on already learned parameters, at the time of using the learned model. When the machine learning model 112 at the time of inference is the CNN, the machine learning model 112 may include a plurality of stages of convolutional layers and pooling layers defined by the definition data, and a fully combined layer, and extracts a feature amount of the image data to perform image processing based on the extracted feature amount.

The image data processed by the machine learning model 112 and the image data determined to be a predictable area by the predictable area determining unit 111a are input to the output unit 113. The output unit 113 includes a set image generating unit (predicted data generating unit) 113a and an image combining unit (data combining unit) 113b. The set image generating unit 113a performs predetermined image processing (data processing) with respect to the image data (data area) determined as a predictable area. For example, if the inferring process is to be performed for enhancing the resolution, an image in which the predictable area is enlarged according to the setting is generated. Adjustment of the boundary portion by the reference range in the convolution processing as described above may be performed here. The image combining unit 113b combines target data processed in the machine learning model 112 with the data generated by the predicted data generating unit 113a. Here, the image data processed in the machine learning model 112 is re-combined with the image generated by the set image generating unit 113a by using coordinate information added to each pixel of the image data. In pixels in which the image data processed in the machine learning model 112 and the image generated by the set image generating unit 113a are both present, either side of the pixel may be used, or the pixels may be synthesized. The output unit 113 outputs image data combined by the image combining unit 113b to the storage unit 12. The output data may be drawn as an image in the image processing unit 11 and output to the display unit 14.

The image data output from the output unit 113 can be subjected to specific image processing such as enlargement, noise removal, or colorization, and the output is not limited to the image data, and in the case of classification, a specified class is output.

Figure 3:
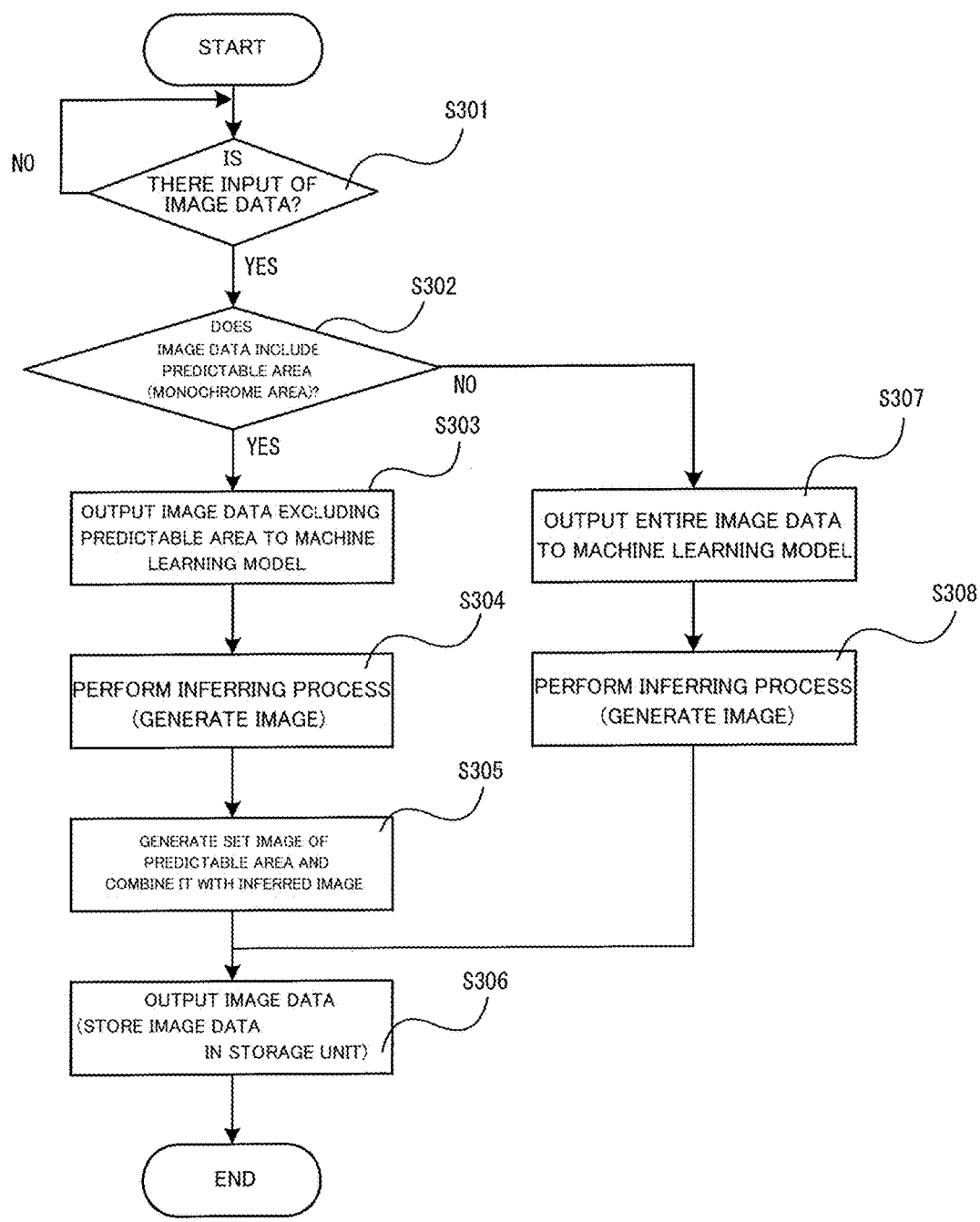
FIG. 3 is a flowchart illustrating an operation procedure when the image processing apparatus performs an inferring operation.

Next, an operation procedure when the image processing apparatus 1 according to the first embodiment operates as an inferring apparatus is described with reference to FIG. 3. FIG. 3 is a flow of processing image data in its entirety. First, when there is an input of image data to the input unit 111 (Yes at S301), the predictable area determining unit 111a determines whether the image data has a predictable area (for example, a perfect monochrome area) (S302). When the image data includes a predictable area (Yes at S302), the input unit 111 outputs the image data in which at least a part of the predictable area is skipped to the machine learning model 112, and outputs the predictable area to the output unit 113 (S303). Next, an inferring process by the CNN or the like is performed with respect to the input image data in the machine learning model 112 to generate an inferred image (S304). The set image generating unit 113a performs predetermined image processing (for example, an enlargement process) to the predictable area to generate a set image. The set image is combined with the inferred image by the image combining unit 113b (S305), and the result thereof is stored in the storage unit 12 (S306).

Meanwhile, when the predictable area determining unit 111a determines that the target image data input to the input unit 111 does not include a predictable area (No at S302), the input unit 111 outputs the entire target image data to the machine learning model 112 (S307). Next, the inferring process is performed in the machine learning model 112 to generate an image (S308).

Figure 4:
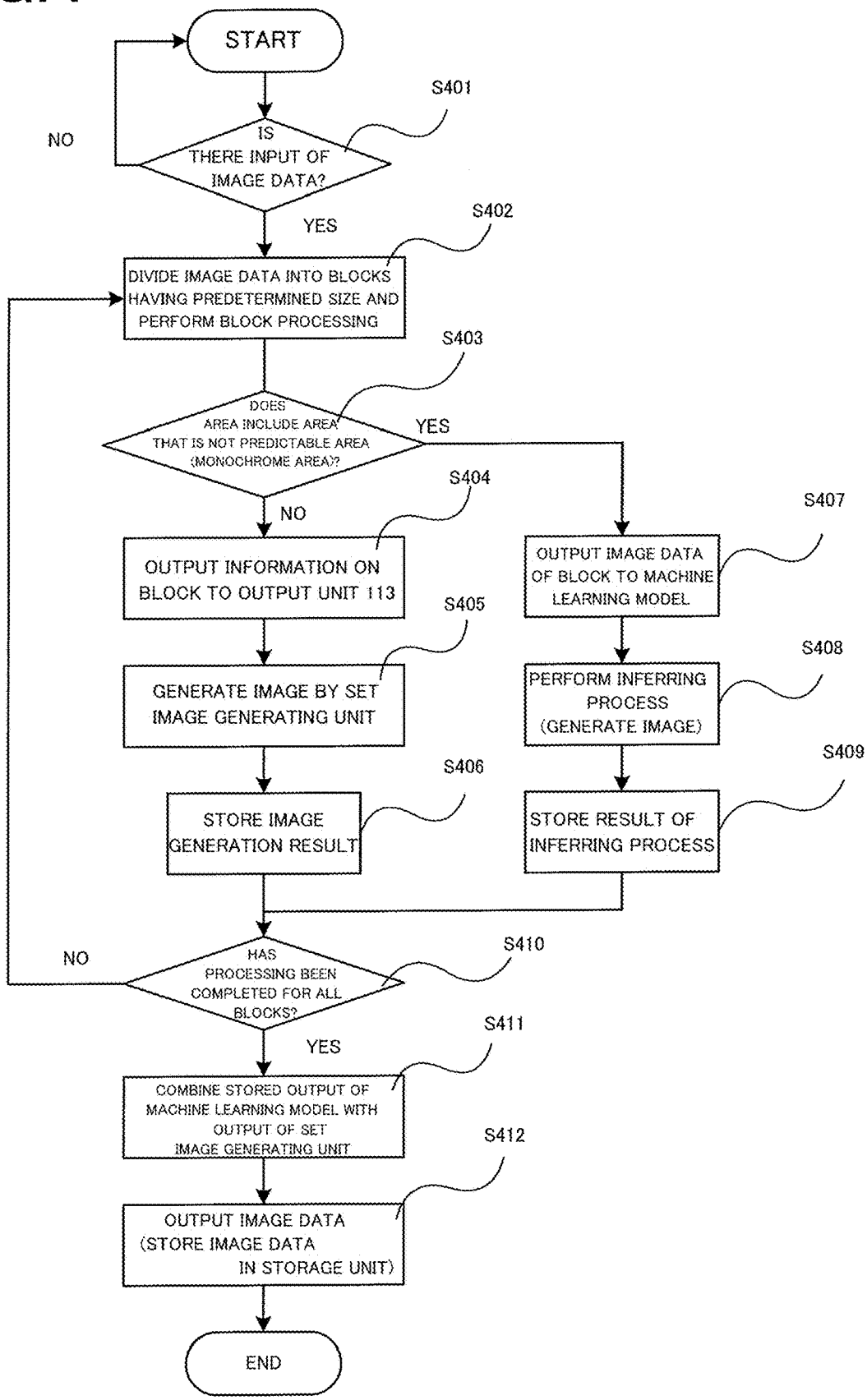
FIG. 4 is a flowchart illustrating another specific example of an operation procedure when the image processing apparatus performs the inferring operation.

Next, a detailed flow when the block dividing unit 111c divides the image data into blocks to process the image data is described with reference to FIG. 4.

First, when there is an input of image data to the input unit 111 (Yes at S401), the block dividing unit 111c divides the input image data to blocks having a desired size (S402), and the predictable area determining unit 111a determines whether an area corresponding to an output of a block includes an area that is not a predictable area (for example, a perfect monochrome area) (S403). When the area corresponding to the output of the block does not include an area that is not a predictable area (No at S403), the input unit 111 outputs image information on the block to the output unit 113 (S404). As described above, a padding timing of the data at the boundary portion between the predictable area and other areas may be before the block dividing process performed at Step S402. In this case, it is also determined whether the image includes a predictable area at Step S401, and the padded data is divided into blocks. Further, when the image data is padded after being divided into blocks, it suffices that the divided block is padded at the time of determining whether the area includes the predictable area at Step S403.

In the case of image data including a predictable area (No at S403), the input unit 111 outputs the information on the block to the output unit 113 (S404). The set image generating unit 113a of the output unit 113 generates an image based on the input data (S405), and the generated image is temporarily stored in a memory or the like (S406).

On the other hand, at Step S403, image data of a block determined that the area corresponding to the output of the block includes an area that is not a predictable area (Yes at S403) is output to the machine learning model 112 (S407). The inferring process by the CNN or the like is performed in the machine learning model 112 to generate an inferred image (S408), and the generated image is temporarily stored in the memory or the like (S409).

Next, it is determined whether the inferring process has been completed for all the blocks (S410), and when the inferring process has not been completed for all the blocks (No at S410), control returns to Step S403 to perform the process for the next block. On the other hand, when it is determined that the inferring process has been completed for all the blocks (Yes at S410), an output of the machine learning model 112 temporarily stored in the memory or the like and an output of the set image generating unit 113a are combined by the image combining unit 113b (S411), and the image data output is stored in the storage unit 12 (S412).

When the processing performed in the machine learning model is super-resolution processing on the input image data, the set image generating unit 113a performs the enlargement process. That is, a process of simply increasing the number of pixels in a block formed by a monochrome area or the like is performed. Further, according to a method of the CNN, the block processing is not essential, and image data having an arbitrary shape skipped in a unit of a pixel may be output to the machine learning model.

Figure 5:
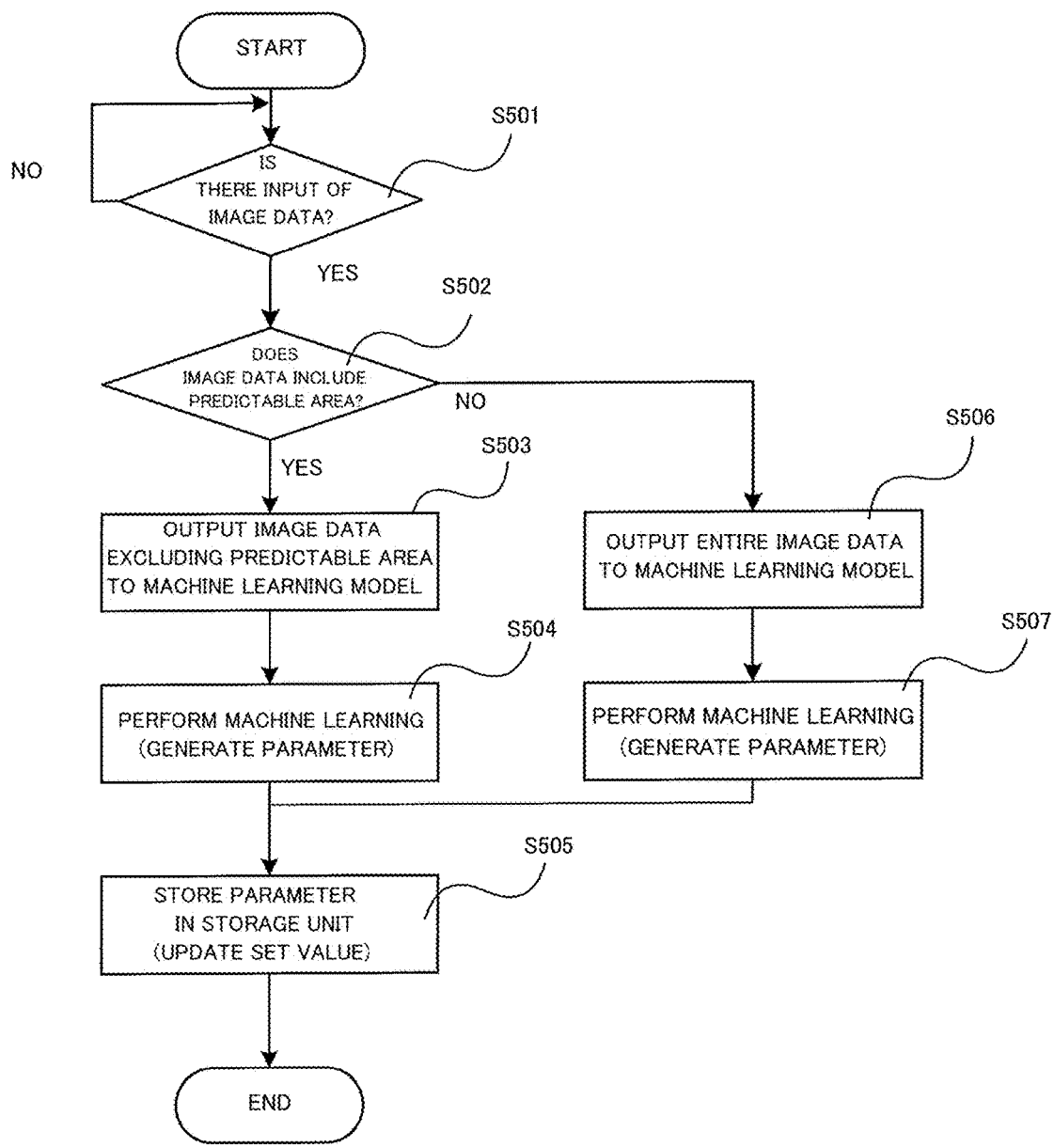
FIG. 5 is a flowchart illustrating an operation procedure when the image processing apparatus performs a learning operation.

Next, an operation procedure when the image processing apparatus 1 according to the first embodiment operates as a learning apparatus is described with reference to FIG. 5. FIG. 5 is a flow of processing image data in its entirety.

First, when there is an input of learning data (image data) to the input unit 111 (Yes at S501), the predictable area determining unit 111a determines whether the image data has a predictable area in which there is low necessity of learning a set value (S502). Here, the predictable area determining unit 111a determines that at least a part of continuous areas having the sample value in the learning data is a predictable area. The predictable area determining unit 111a may function as a high-frequency component determining unit that determines an area having no high-frequency component as a predictable area based on high-frequency components in the learning data. When the area includes a predictable area (Yes at S502), the input unit 111 outputs image data in which the predictable area is skipped to the machine learning model 112 (S503). In the machine learning model 112, parameter generation or update processing of a machine learning model (update processing of a set value) is performed (S504). Update of the set value is a minimizing process of a difference between input data and solution data, such as updating the parameter by a Mini-Batch Gradient Descent. Next, the updated set value is stored in the storage unit 12 (S505).

On the other hand, when the predictable area determining unit 111a determines that the learning data input to the input unit 111 does not include a predictable area (No at S502), the input unit 111 outputs the entire image data to the machine learning model 112 (S506). Next, at the time of learning, update of parameters of the machine learning model (update processing of the set value) is performed in the machine learning model 112, and the result thereof is stored in the storage unit 12 (S507).

Thus, the image processing apparatus 1 according to the first embodiment separates a predictable area from learning data and prepares the machine learning model 112, which has been learned exclusively for areas other than the predictable area. With this configuration, the predictable area can be separated from the learning data, and a machine learning model can be set to image data excluding the predictable area. When a portion required for learning in the machine learning model overlaps on the predictable area, learning data including the predictable area may be input to the machine learning model 112 and learned.

Figure 6:
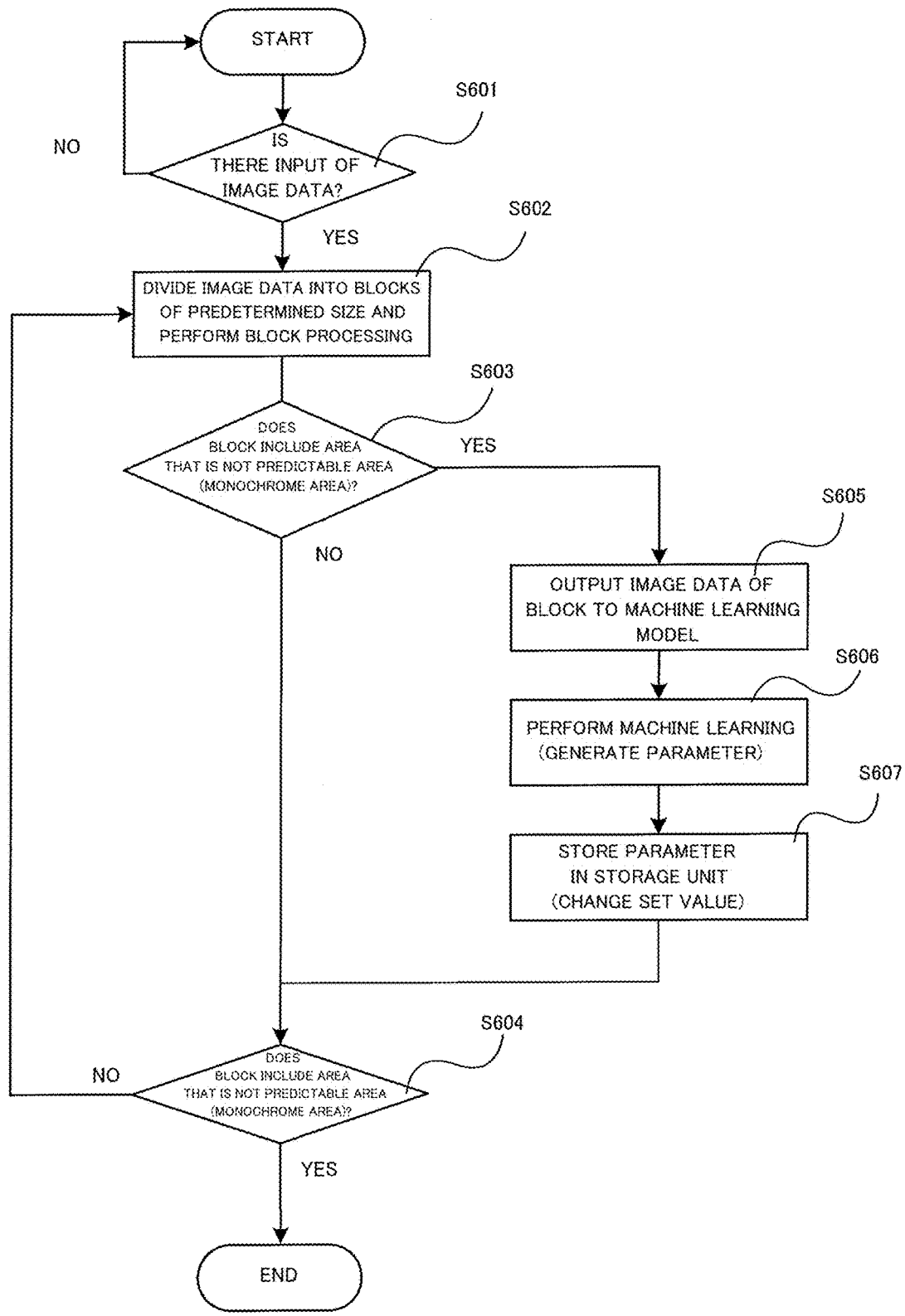
FIG. 6 is a flowchart illustrating another specific example of an operation procedure when the image processing apparatus performs the learning operation.

Next, a detailed flow when image data is divided by the block dividing unit 111c and learned is described with reference to FIG. 6.

First, when there is an input of learning data (image data) to the input unit 111 (Yes at S601), the block dividing unit 111c of the predictable area determining unit 111a divides the input image data into blocks having a predetermined size (S602). Thereafter, the monochrome area determining unit 111b of the predictable area determining unit 111a determines whether an area corresponding to an output of the divided block includes an area that is not a predictable area (S603), and when an area that is not a predictable area is not included (No at S603), determines whether the learning process has been completed for all the blocks (S604). When the learning process has not been completed for all the blocks (No at S604), control returns to Step S603 to perform the determination process for the next block.

On the other hand, when the area corresponding to the output of the divided block includes an area that is not a predictable area (Yes at S603), the monochrome area determining unit 111b outputs the image data of the block to the machine learning model 112 (S605), to perform machine learning by using the machine learning model 112 (S606), and a parameter is stored in the storage unit (the set value is changed) (S607). Update of the set value is the minimizing process of a difference between the input data and the solution data, such as updating the parameter by the Mini-Batch Gradient Descent. Next, the monochrome area determining unit 111b determines whether the learning process has been completed for all the blocks (S604), and when the learning process has not been completed for all the blocks (No at S604), control returns to Step S603 to perform the determination process for the next block.

Figure 7:
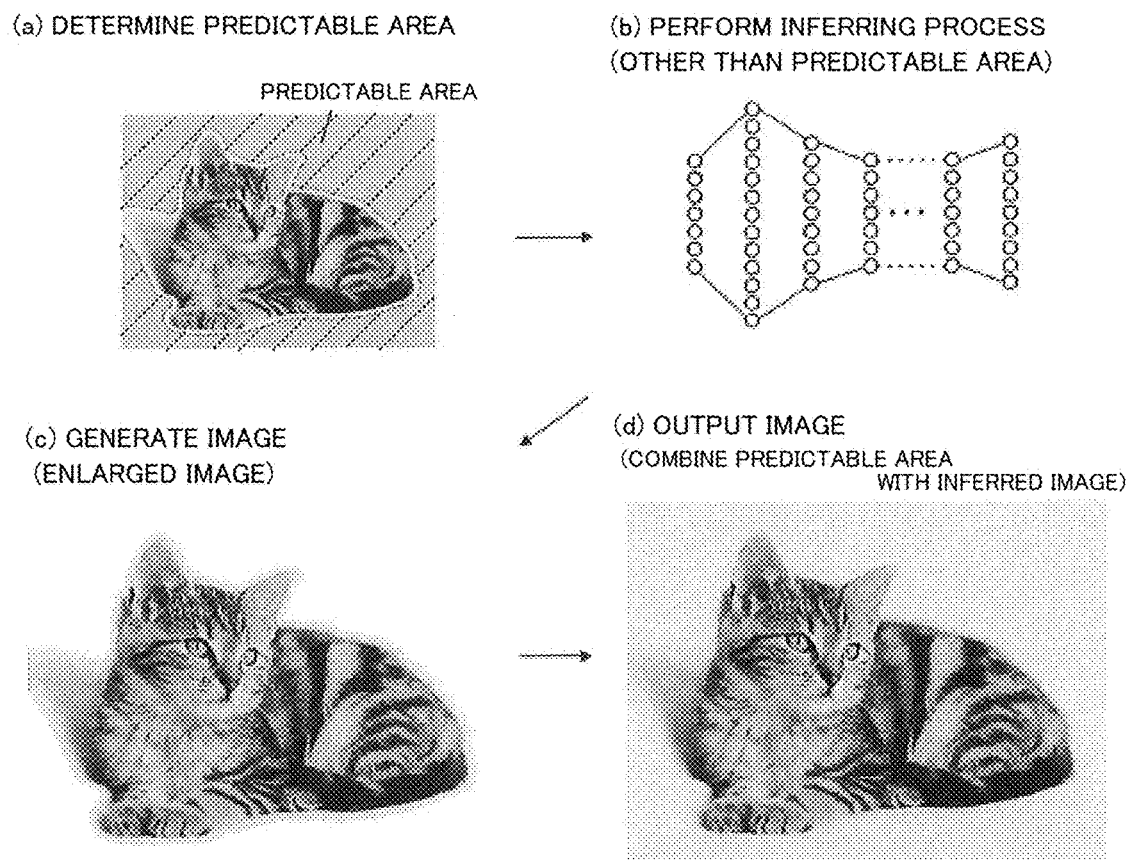
FIG. 7 is an image diagram illustrating transition of an image when the image processing apparatus performs the inferring operation.

A transition image diagram when an inferred image is generated (generation of high-resolution image) by the image processing apparatus 1 according to the first embodiment is illustrated in FIG. 7. As illustrated in (a) in FIG. 7, image data includes a perfect monochrome predictable area or a predictable area of a certain range (a hatched area) that does not include a high-frequency component, and as illustrated in (b) in FIG. 7, image data excluding the predictable area is output to the machine learning model 112 to perform an inferring process. By combining the inferred image generated in the machine learning model 112 illustrated in (c) in FIG. 7 with a set image of image data of the predictable area generated by the set image generating unit 113a, a final inferred image illustrated in (d) in FIG. 7 is generated.

As described above, when functioning as the inferring apparatus using a learned model, the image processing apparatus (inferring apparatus) 1 according to the first embodiment uses the definition data and parameters stored in the storage unit 12 to generate an image by using the machine learning model 112 exclusive for the image data excluding at least a part of the predictable area. The inferring process executing unit 102 outputs an output image combined by the image combining unit 113b.

With this configuration, the image processing apparatus 1 can improve efficiency and accuracy of machine learning using image data, by omitting (skipping) an input to a predictable area in machine learning such as the convolutional neural network, to reduce a computation amount and reduce the processing load. That is, the number of parameters and a computation amount can be reduced, while maintaining and improving expressiveness (accuracy) in the inferring process, thereby enabling to realize a higher accuracy model.

Meanwhile, learning by the machine learning model 112 can be performed by using image data in which at least a part of the predictable area is removed, and more efficient processing can be performed in the image processing by the machine learning. More specifically, the learning process executing unit 101 performs a minimizing process of an error between output data acquired by inputting learning data excluding the predictable area to the machine learning model 112 and known image data for learning, thereby enabling to update the parameter (weight). The parameter acquired by the learning process is stored in the storage unit 12. At this time, the storage unit 12 functions as a learning result storage unit.

As described above, the data to which the present invention is applied is data that represents a value with respect to a one-dimensional or two-or-more dimensional space as a discrete value at a sample point in the space, and is not limited to the image data. For example, acoustic data represents a sound pressure value with respect to a one-dimensional space of time. Further, video data represents a pixel value with respect to a three-dimensional space of longitudinal direction, lateral direction, and time. These pieces of data can be target data to be subjected to predictable area determination in the predictable area determining unit 111a of the first embodiment, and becomes input data to the input unit 111, to which an inferring method and a learning method according to the present application can be applied. Also in this case, the predictable area determining unit determines at least a part of areas having the same sample value continuous in the target data as a predictable area. Other than this, the inferring method and the learning method according to the present application can be also used with respect to output data of an intermediate layer in a machine learning model.

Among the hardware configurations of the image processing apparatus 1 according to the first embodiment, the communication unit 13, the display unit 14, the operation unit 15, and the read unit 16 are not essential. The communication unit 13 is not used in some cases, after being used once, for example, at the time of acquiring the image processing program 1P and the machine learning library 1L stored in the storage unit 12 from an external server apparatus. Similarly, there is a possibility that the read unit 16 is not used after the image processing program 1P and the machine learning library 1L are read and acquired from a storage medium. The communication unit 13 and the read unit 16 may be the same device using serial communication such as a USB.

The image processing apparatus 1 may have a configuration as a Web server to provide the respective functions as the predictable area determining unit 111a and the machine learning model 112 described above to a Web client apparatus including a display unit and a communication unit. In this case, the communication unit 13 is used to receive a request from the Web client apparatus and transmit a processing result.

As an error to be used at the time of inferring and learning, an appropriate function according to data to be input and output and a learning object is preferably used, such as a square error, an absolute value error, or a cross entropy error. For example, when an output is classification, the cross entropy error is used. The appropriate function is not limited to the error function, and flexible operation can be applied, for example, by using other standards. Evaluation may be performed by using an external machine learning model for the error function itself. For example, the predictable area determining unit 111a can include an area having an error in a predetermined range in the determination of the predictable area. For example, a mean square error is used and a range in which a value of the error is in a range of a certain value or less may be set as a range of the error, or a range in which a coefficient after passing through a high-pass filter has a certain value or less may be set as a range of the error.

(Modification)

A modification of the image processing apparatus 1 according to the first embodiment of the present invention is described. In the modification, the learning process executing unit 101 outputs image data including a predictable area to the machine learning model 112, at the time of performing the learning process. Further, the learning process executing unit 101 adds a plurality of pieces of image data including a predictable area or weights an error in the predictable area. Accordingly, in the machine learning model 112, although there is a possibility to increase a computation amount in learning and decrease accuracy in areas other than the predictable area, learning can be performed more accurately in the predictable area. Accordingly, in the inferring process, when an input of a predictable area to the machine learning model 112 is skipped, such a possibility that an error occurs, for example, between a skipped block and a non-skipped block to generate block noise can be reduced.

For example, when the CNN is used as the machine learning model, if a monochrome area is machine learned, the same color is not always output because the area is biased or high-frequency noise is superimposed. Therefore, by learning image data including a predictable area by a machine learning model, a learning result of a portion adjacent to the predictable area or a portion including a part of the predictable area, of the image data output to the machine learning model, becomes more accurate.

Second Embodiment

Figure 8:
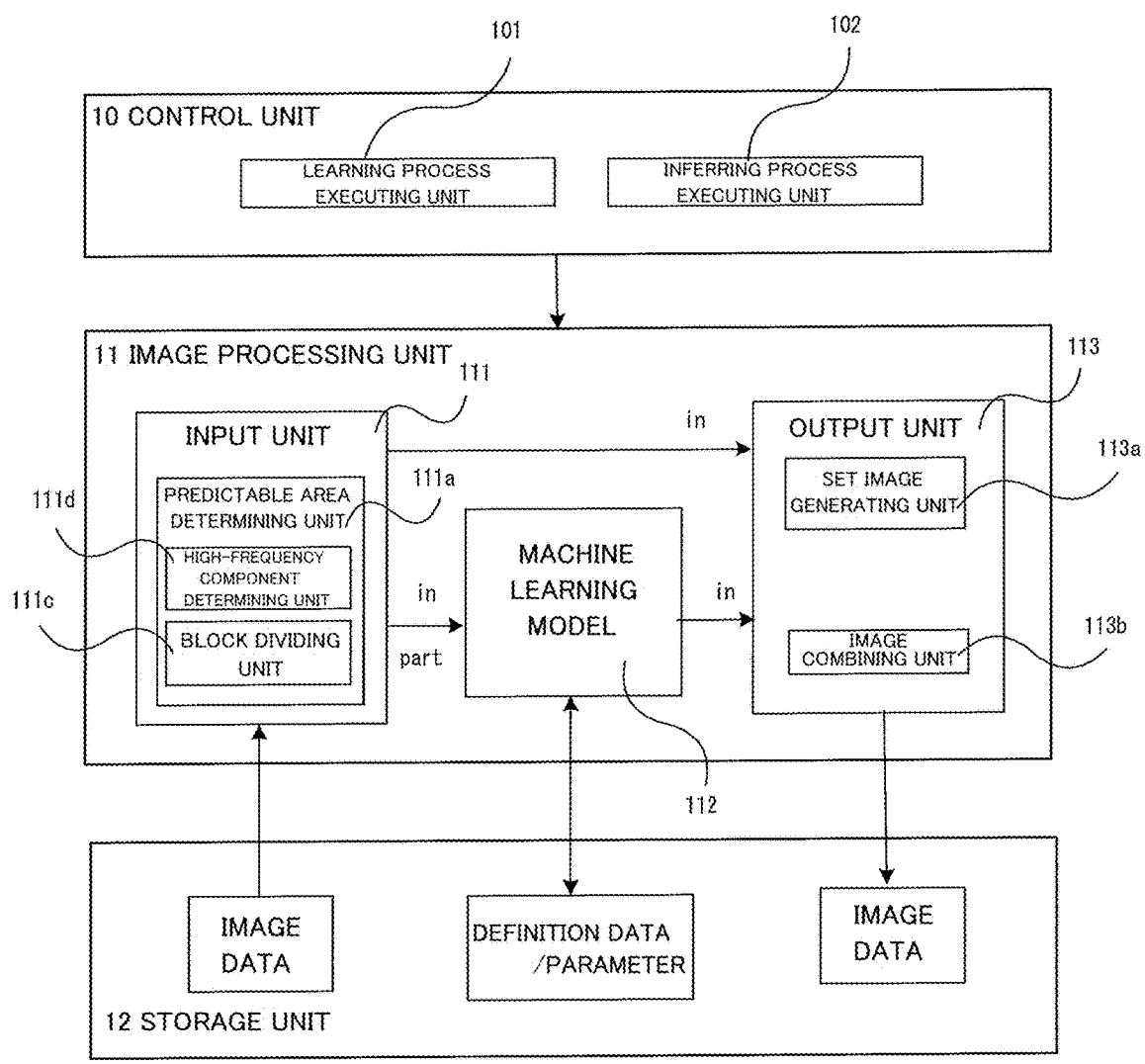
FIG. 8 is a functional block diagram of an image processing apparatus according to a second embodiment of the present invention.
Figure 9:
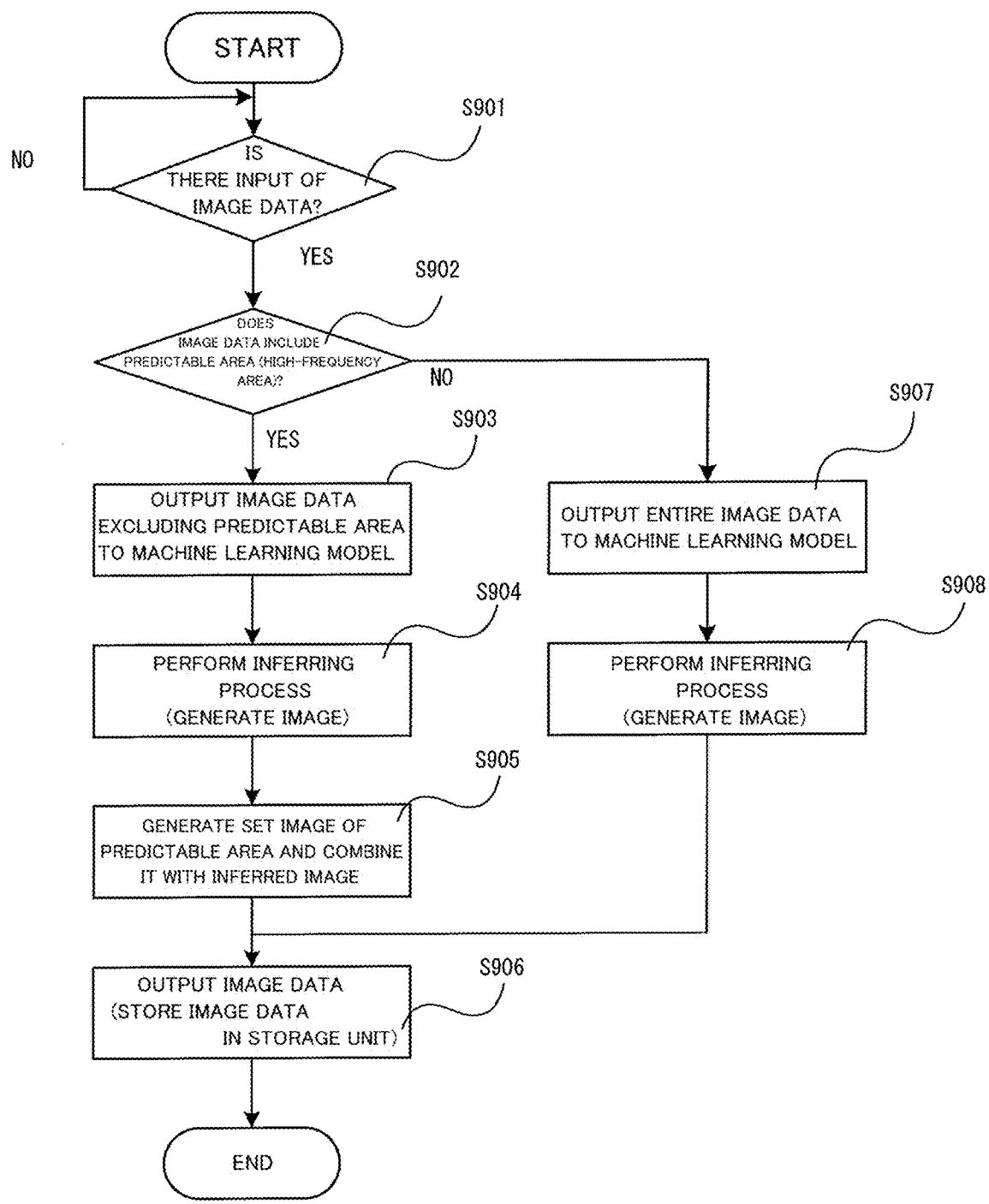
FIG. 9 is a flowchart illustrating an operation procedure when the image processing apparatus performs an inferring operation.

An image processing apparatus according to a second embodiment of the present invention is described with reference to FIG. 8 and FIG. 9. Constituent elements identical to those of the image processing apparatus 1 according to the first embodiment described above are denoted by like reference signs, and detailed explanations thereof are omitted.

Generally, image data includes high-frequency components according to the type thereof, for example, an illustrated image includes many edge portions, and a landscape image has a less change in the image and includes less high-frequency components. The predictable area determining unit 111a of the image processing apparatus 1 according to the second embodiment includes a high-frequency component determining unit 111d that determines an area having no high-frequency component as a predictable area based on high-frequency components in target image data. Here, the high-frequency component determining unit 111d determines a high-frequency component by using a high-pass filter. At the time of determining a predictable area, the block dividing unit 111c may divide image data to be input into blocks of an arbitrary size and perform determination of a high-frequency component in a unit of a block, or may perform determination of a high-frequency component without dividing the image data into blocks.

Next, an operation procedure when the image processing apparatus 1 according to the second embodiment operates as an inferring apparatus is described with reference to FIG. 9. FIG. 9 is a flow of processing image data in its entirety. First, when there is an input of image data to the input unit 111 (Yes at S901), the predictable area determining unit 111a determines whether the image data has a predictable area (for example, a high-frequency area) (S902). When the image data includes a predictable area (Yes at S902), the input unit 111 outputs the image data in which at least a part of the predictable area is skipped to the machine learning model 112, and outputs the predictable area to the output unit 113 (S903). Next, an inferring process by the CNN or the like is performed with respect to the input image data in the machine learning model 112 to generate an inferred image (S904). The set image generating unit 113a performs predetermined image processing (for example, an enlargement process) to the predictable area to generate a set image. The set image is combined with the inferred image by the image combining unit 113b (S905), and the result thereof is stored in the storage unit 12 (S906).

On the other hand, when the predictable area determining unit 111a determines that the target image data input to the input unit 111 does not include a predictable area (No at S902), the input unit 111 outputs the entire target image data to the machine learning model 112 (S907). Next, the inferring process is performed in the machine learning model 112 to generate an image (S908).

As described above, when the image processing apparatus 1 according to the second embodiment functions as an inferring apparatus using a learned model, the image processing apparatus 1 uses definition data and parameters stored in the storage unit 12 to generate an image by using the machine learning model 112 exclusive for image data, in which at least a part of the predictable area is removed based on the presence of a high-frequency component. The inferring process executing unit 102 outputs an output image combined by the image combining unit 113b. With this configuration, the image processing apparatus 1 can exert the same action and effect as those of the first embodiment. To extract a predictable area, data extracted by using constituent parts of a low-pass filter or a band-pass filter may be used. Further, the predictable area determining unit 111a may include both the monochrome area determining unit 111b in the first embodiment and the high-frequency component determining unit 111d in the second embodiment, or may include an apparatus that performs other determination. A machine learning model may be used for such determination, or the determination may be performed in a unit of a pixel or in a unit of a block as in the first and second embodiments.

Third Embodiment

An image processing apparatus according to a third embodiment of the present invention is described with reference to FIG. 10 and FIG. 11. Constituent elements identical to those of the image processing apparatus 1 according to the first and second embodiments described above are denoted by like reference signs, and detailed explanations thereof are omitted.

At the time of performing super-resolution processing on image data by using a machine learning model, the image processing apparatus according to the third embodiment performs the super-resolution processing on the image data with high accuracy and at a high speed by using both a machine learning model in which the processing load is heavy (that takes time in processing) and a machine learning model in which the processing load is light (that takes less time in processing).

The image processing apparatus according to the third embodiment includes a complexity determining unit 111e in the predictable area determining unit 111a of the input unit 111. When the image divided into blocks is a complicated image, data is output to the machine learning model 112 (a first machine learning model), and when the image is a monochrome area in which a considerable number of pixels in a block have the same data, or is a simple image, for example, in which a straight line crosses in a block, data of the block is output to the set image generating unit 113a of the output unit 113. Further, complexity determination may be performed based on brightness gradient of a pixel in a block or an amount of statistics of the brightness gradient. The set image generating unit 113a processes data in a second machine learning model 113c according to nearest neighbor interpolation, bi-linear interpolation, or the like and combines an output of the first machine learning model 112 with an output of the second machine learning model 113c by the image combining unit 113b to acquire image data as an inferring result.

Figure 10:
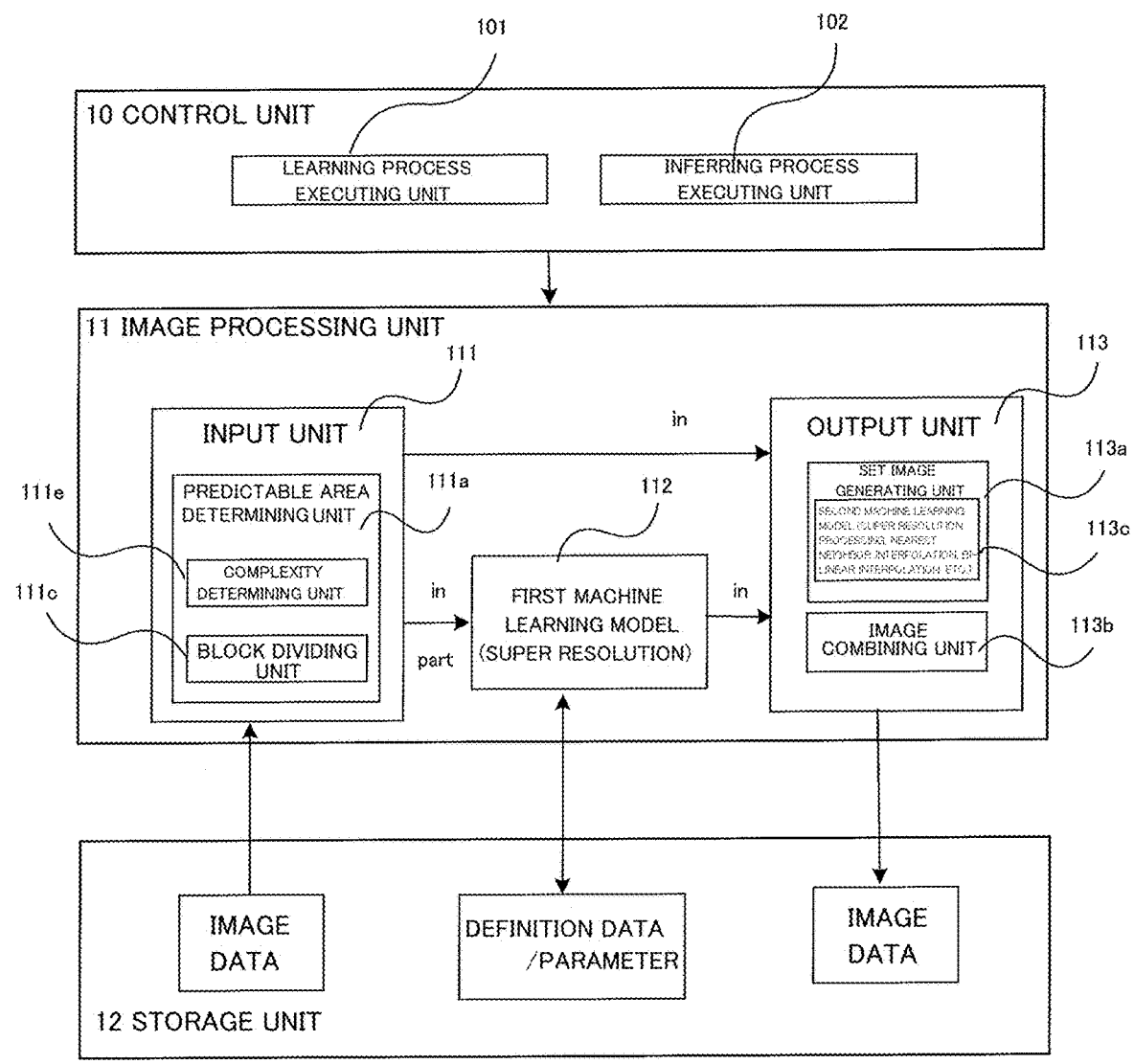
FIG. 10 is a functional block diagram of an image processing apparatus according to a third embodiment of the present invention.
Figure 11:
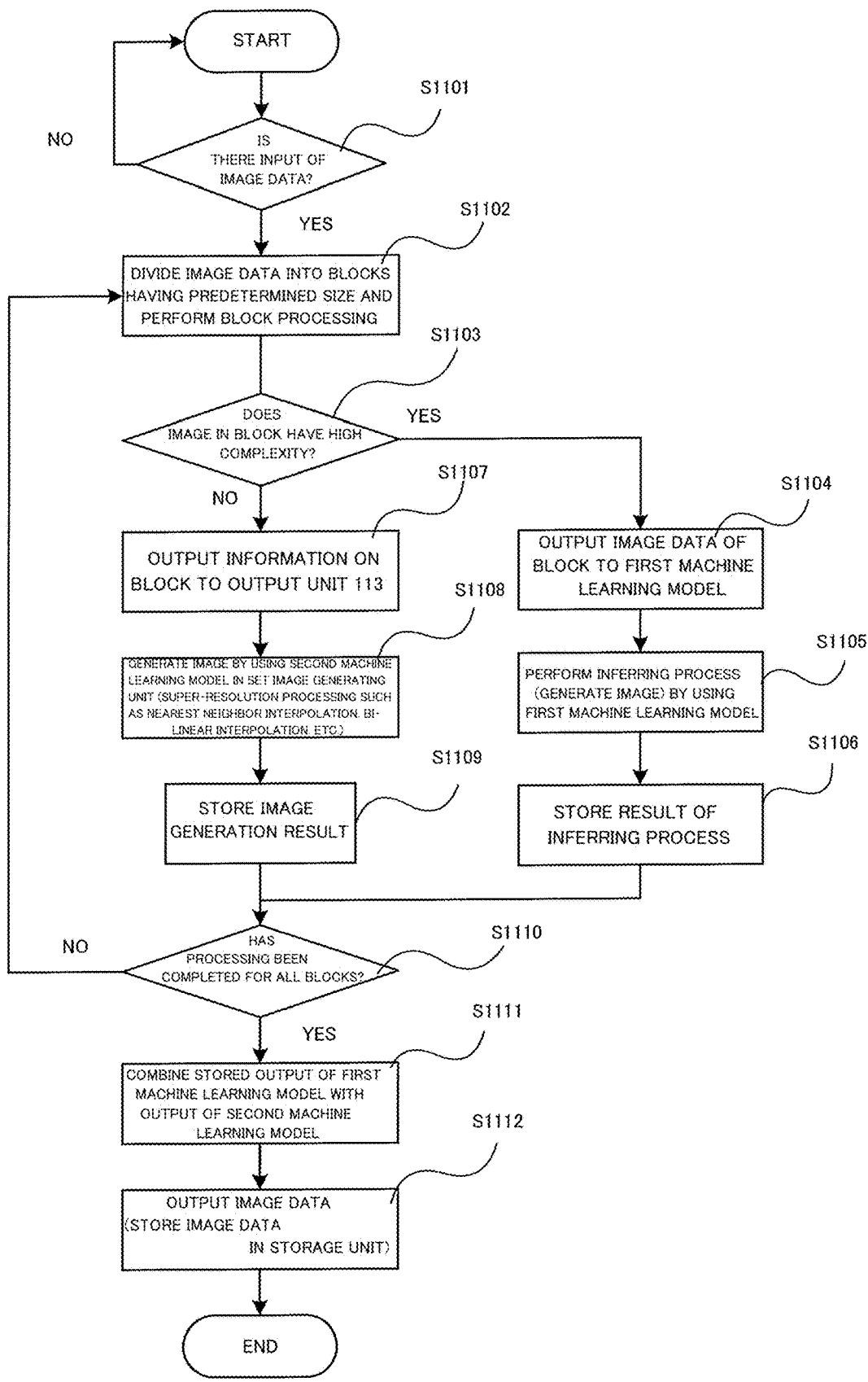
FIG. 11 is a flowchart illustrating an operation procedure when the image processing apparatus performs an inferring operation.

FIG. 11 is a diagram illustrating a processing flow at the time of inference according to the third embodiment illustrated in FIG. 10. First, when there is an input of image data to the input unit 111 (Yes at S1101), the block dividing unit 111c in the predictable area determining unit 111a divides the input image data into blocks of a predetermined size (S1102). Thereafter, the complexity determining unit 111e in the predictable area determining unit 111a determines whether an image of a divided block is complicated data (S1103). When the image is complicated data (Yes at S1103), the image data of the block is output to the first machine learning model 112 (S1104). In the first machine learning model 112 to which the data is input, the inferring process is performed (S1105), and the result thereof is stored in a memory or the like (S1106).

On the other hand, when a block to be processed is not complicated data, for example, a monochrome area or data in which a straight line crosses in a block (No at S1103), information on the block is output to the output unit 113. In the output unit 113, super-resolution processing such as bi-linear interpolation is performed in the second machine learning model 113c of the set image generating unit 113a to generate an image (S1108), and the generated image is stored in the memory or the like (S1109).

Thereafter, it is determined whether the inferring process has been completed for all the blocks (S1110). When the inferring process has not been completed for all the blocks (No at S1110), control returns to Step S1102, to perform the process for the next block.

On the other hand, when the inferring process has been completed for all the blocks (Yes at S1110), the image combining unit 113b combines the stored output of the first machine learning model 112 and the output of the second machine learning model 113c (S1111), and outputs a combined result as image data (S1112).

In the third embodiment, light-load processing that does not take time in the processing is referred to as the second machine learning model for convenience sake. However, a machine learning model other than the CNN that has been conventionally used in super-resolution processing and a machine learning model formed by combining pattern recognition and a single-layer CNN can be also used. The nearest neighbor interpolation and the bi-linear interpolation can be regarded as a machine learning model having only a Resize Layer. Further, although being referred to as the second machine learning model, super-resolution processing not relying on machine learning can be used as a function of the second machine learning model.

As described above, by using both the machine learning model in which the processing load is light (as described above, not necessarily limited to processing included in the category of the machine learning model) and the machine learning model in which the processing is heavy, for example, in such a manner that data of a portion such as a monochrome area is inferred by using the machine learning model in which the processing load is light, and data of an area of a complicated image is inferred by using the machine learning model in which the processing load is heavy, the speed of processing can be increased and accuracy of super resolution being the inferred result can be improved.

When the image processing apparatus 1 according to the third embodiment operates as a learning apparatus, the first machine learning model and the second machine learning model are learned. Specifically, when the image processing apparatus 1 according to the third embodiment operates as the learning apparatus, the image processing apparatus 1 determines the presence of a predictable area in the learning data, similarly to the image processing apparatus 1 according to the first embodiment. When learning data includes a predictable area, learning data in which the predictable area is skipped is output to the first machine learning model, to perform parameter generation or update processing in the first machine learning model. Further, the predictable area is output to the second machine learning model to perform parameter generation or update processing in the second machine learning model. On the other hand, when a predictable area is not included in the learning data, the entire learning data (the entire image data) is input to the first machine learning model.

Fourth Embodiment

Figure 12:
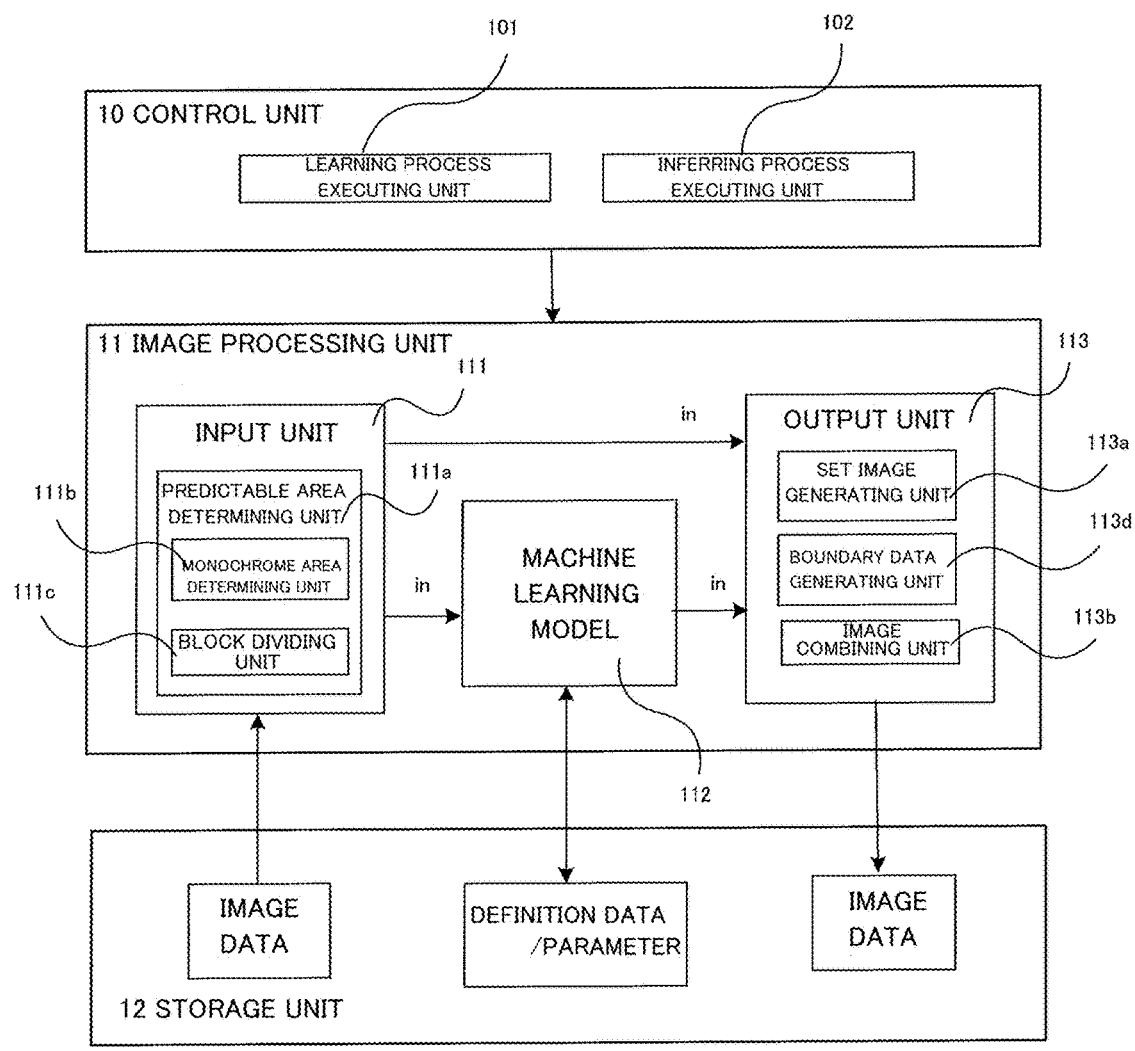
FIG. 12 is a functional block diagram of an image processing apparatus according to a fourth embodiment of the present invention.
Figure 13:
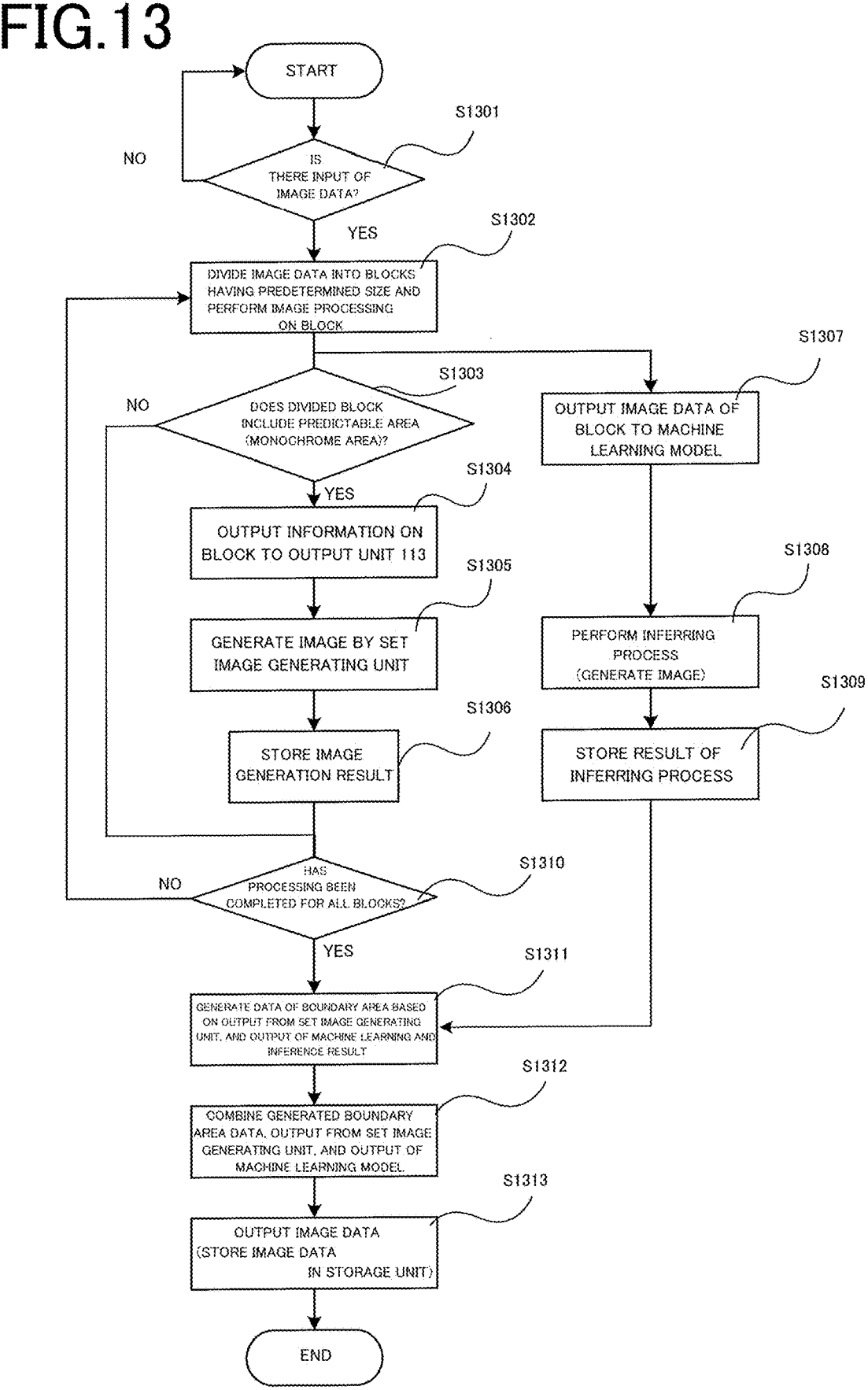
FIG. 13 is a flowchart illustrating an operation procedure when the image processing apparatus performs an inferring operation.

Next, an image processing apparatus according to a fourth embodiment of the present invention is described with reference to FIG. 12 and FIG. 13. Constituent elements identical to those of the image processing apparatus 1 according to the first, second, and third embodiments described above are denoted by like reference signs, and detailed explanations thereof are omitted.

The first, second and third embodiments described above have an object to simplify the processing when machine learning in which the processing load is heavy is to be used, and have achieved the object. The fourth embodiment has an object to enhance the image quality of a super resolution image as an inferring result. Therefore, at the time of inferring an area that is not a predictable area, the entire data including the predictable area is used in a machine learning model.

Figure 2:
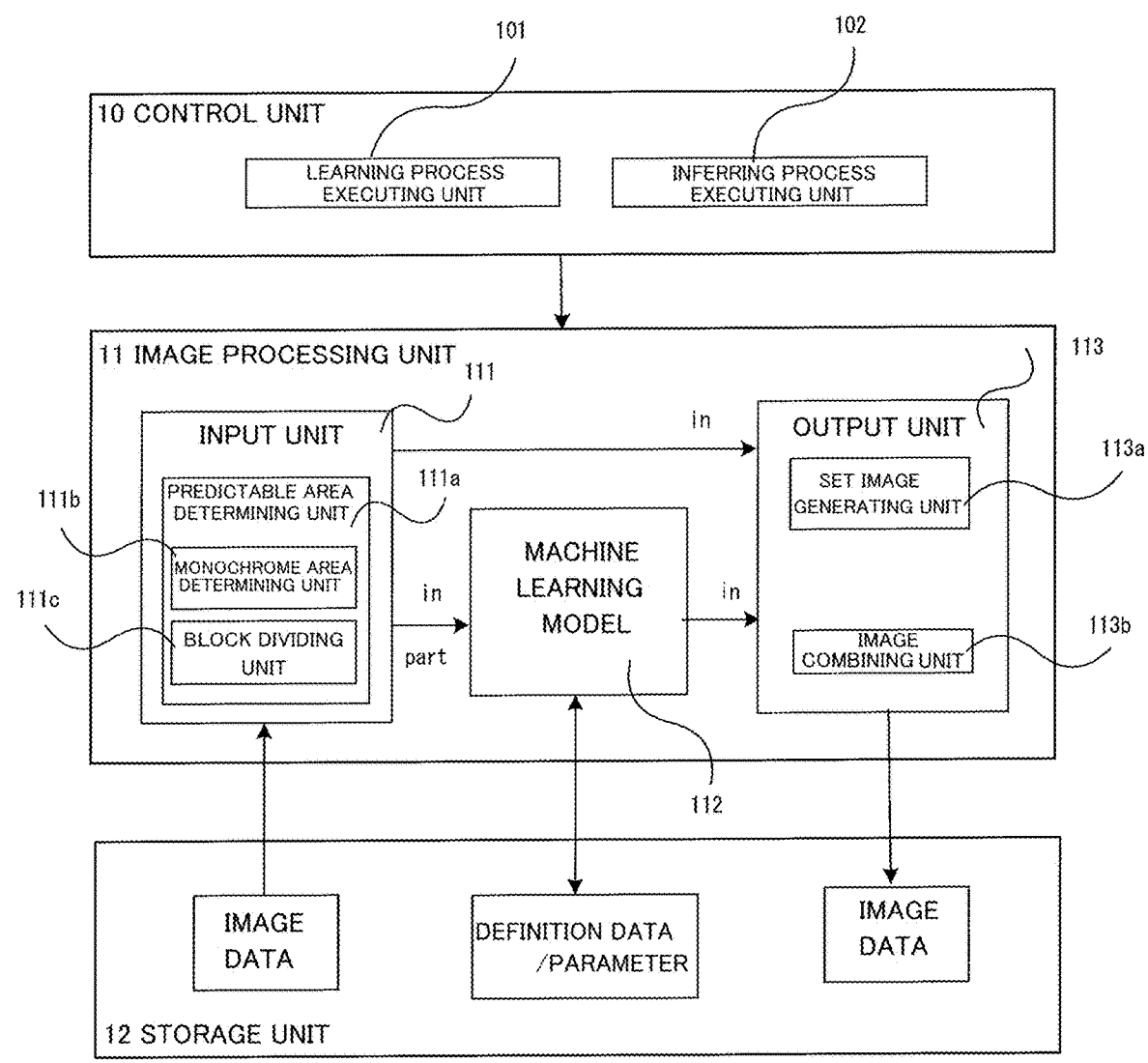
FIG. 2 is a functional block diagram of the image processing apparatus.

The image processing apparatus according to the fourth embodiment of the present invention is different from the image processing apparatus illustrated in FIG. 2 in that the output unit 113 includes a boundary data generating unit 113*d*, and the entire data is output to the machine learning model, regardless of whether the data includes a predictable area. In the following descriptions, operations of the image processing apparatus according to the fourth embodiment are described with reference to FIG. 13.

First, when there is an input of learning data (image data) to the input unit 111 (Yes at S1301), the block dividing unit 111*c* in the predictable area determining unit 111*a* divides the input image data into blocks of a predetermined size (S1302). Thereafter, the monochrome area determining unit 111*b* in the predictable area determining unit 111*a* determines whether all the areas corresponding to outputs of the divided blocks are predictable areas (S1303). When all the areas are predictable areas (Yes at S1303), information on the blocks are output to the output unit 113 (S1304). In the output unit 113, the set image generating unit 113*a* generates an image (S1305), and stores the generated image in a memory or the like (S1306). The monochrome area determining unit 111*b* determines whether processing for all the blocks has been completed (S1310). When the processing for all the blocks has not been completed (No at S1310), control returns to Step S1302, to perform the determination process for the next block.

On the other hand, when all the areas corresponding to the outputs of the divided blocks are not the predictable area (No at S1303), control proceeds to Step S1310, to determine whether the processing for all the blocks has been completed. Further, the data of the divided blocks are output to the machine learning model 112 regardless of whether the data includes a predictable area (S1307), and the inferring process is performed in the machine learning model 112 (S1308). An output of the machine learning model 112 is stored in the storage unit such as the memory (S1309).

The boundary data generating unit 113*d* in the output unit 113 generates data of a boundary area based on the output from the set image generating unit 113*a* stored in the memory or the like and the output of the machine learning model 112, that is, by using the image generated by the set image generating unit and identified as a monochrome area, and an image adjacent to the monochrome area and generated by the machine learning model 112 (S1311), to acquire an output image by combining the generated boundary area data, the output from the set image generating unit, and the output of the machine learning model (S1312), and the output image data is stored in the storage unit (S1313). It suffices that the boundary data generating unit 113*d* regards only the area slightly inside of the monochrome area (monochrome side) as monochrome, or performs smoothing of a monochrome boundary of the output of the set image generating unit 113*a* and combines the smoothed output with the output of the machine learning model 112 in a state in which the image has an increased resolution in the original color, or superimposes an area to be processed by the set image generating unit 113*a* and an area to be processed in the machine learning model 112 on each other, and adjusts the pixels in a boundary portion so that a preferable result can be obtained from the superimposed data including the boundary portion.

As described above, when the CNN is used as the machine learning model, even if data of a monochrome area is input to the machine learning model to perform inference, the same color may not always be output. However, by using the output of the machine learning model and the output of the set image generating unit to generate a boundary data, a super-resolution image having high image quality can be acquired. For example, noise (such as mosquito noise or ringing) that often occurs in the processing of the machine learning model can be cancelled. However, although the image data may become discontinuous near the boundary, high quality data can be obtained by optimally setting a threshold indicating whether an output of the machine learning model is used or an output of the set image generating unit is used for the data near the boundary according to a utilization purpose of the super-resolution data.

The fourth embodiment has been described by taking a case in which an image is subjected to super resolution processing as an example. However, the present invention is not limited thereto. With regard to data in which an inferred result of data is predictable at the time of inputting the data to a machine learning model to perform inference, the data is not input to the machine learning model and the result is obtained based on prediction. With regard to data that is not predictable, the data is input to the machine learning model to obtain an inferred result, and the result based on the prediction and the inferred result are combined, thereby performing the inferring process of data in its entirety highly accurately and at a high speed.

Therefore, for example, when defect of a product on a conveyor belt is judged by using machine learning, inference by using the machine learning model can be omitted for an area in which it is not necessary to infer image data (such as a belt or a fixed subject included in an imaging area).

Further, in the respective embodiments described above, in each determination process by the monochrome area determining unit 111*b*, the high-frequency component determining unit 111*d*, and the complexity determining unit 111*e* included in the predictable area determining unit 111*a*, such a configuration may be used that a machine learning model different from the machine learning model 112, preferably, a machine learning model in which the processing load is light is used to perform determination of image data.

The present invention is not limited to the configurations of the embodiments described above and various modifications can be made in a range without changing the spirit of the invention. In order to achieve the object of the present invention, the present invention can be also realized as an image processing method (a learning method and an inferring method) having characteristic constituent units included in an image processing apparatus (a learning apparatus and an inferring apparatus) as steps, or realized as a program including these characteristic steps. The program is not only stored in a ROM or the like but also can be distributed through a recording medium such as a USB memory or a communication network.

Further, the present invention can be also realized as a computer system that transmits input data to an image processing apparatus or a computer program and receives output data from the image processing apparatus or the computer program. This system is a processing system that utilizes data obtained from a machine learning model which has been learned by the processing described above, and that can provide various services. An apparatus used for this system is an image processing apparatus including a display unit and a communication unit or an information processing apparatus that can transmit and receive information to and from a computer, such as a so-called PC, a smartphone, a mobile terminal, or a game machine.

Summary of Operations and Effects of Aspect
Examples of Embodiments

First Aspect

An inferring apparatus according to a first aspect is an inferring apparatus that performs a predetermined inferring process with respect to data, in which a value with respect to a one-dimensional or two-or-more dimensional space is represented as a discrete value at a sample point in the space, by using a machine learning model. The inferring apparatus includes an input unit (111) that receives an input of target data, a predictable area determining unit (111a) that determines whether target data input to the input unit has a predictable area (a monochrome area, an area having no high-frequency component, a non-complicated area) in which an inferring result of the inferring process can be easily predicted, a machine learning model (112) to which data is input from the input unit. The inferring apparatus also includes an inferring process executing unit (102) that performs a predetermined inferring process with respect to the target data by using the machine learning model, and a predicted data generating unit (a set image generating unit 113a) that performs predetermined data processing (an enlargement process or an inferring process by using a second machine learning model of the second embodiment) with respect to a data area, which is determined as the predictable area. The inferring process executing unit outputs data required for inferring an area (data other than the predictable area in the image data of the first to third embodiments, and the entire image data of the fourth embodiment), which is not a predictable area, to the machine learning model, and the data processing is performed in an average time shorter than that of the inferring process (refer to the first to fourth embodiments). According to the first aspect, it is possible to prevent such problems that a computation amount increases, efficiency of a learning process decreases, and an inferring result does not have high accuracy.

Second Aspect

The inferring apparatus according to a second aspect further includes a data combining unit (113b) that combines the target data processed in the machine learning model with data generated by the predicted data generating unit, and an output unit (113) that outputs data combined by the data combining unit. According to the second aspect, data that can display the entire image indicated by the target data can be acquired.

Third Aspect

In the inferring apparatus according to a third aspect, the predictable area determining unit determines at least a part of areas having a same sample value continuous in the target data as a predictable area. According to the third aspect, for example, a monochrome area can be determined as a predictable area.

Fourth Aspect

In the inferring apparatus according to a fourth aspect, the predictable area determining unit includes a high-frequency component determining unit (111d) that determines an area having no high-frequency component as a predictable area based on high-frequency components in the target data. According to the fourth aspect, an area having no high-frequency component can be determined as a predictable area.

Fifth Aspect

The inferring apparatus according to a fifth aspect includes a block dividing unit (111c) that divides image data input to the input unit into areas, and the predictable area determining unit performs determination of a predictable area in a unit of a block divided by the block dividing unit. Also in the fifth aspect, same effects as those of the first aspect can be obtained.

Sixth Aspect

In the inferring apparatus according to a sixth aspect, the inferring process executing unit outputs data in which all of or at least a part of a predictable area is skipped to the machine learning model (the first to third embodiments). According to the sixth aspect, the effect of enabling to reduce a computation amount is remarkably noticeable, as compared to a configuration in which the entire image data is uniformly output to the machine learning model.

Seventh Aspect

In the inferring apparatus according to a seventh aspect, the predictable area determining unit includes an area having an error in a predetermined range in the determination of a predictable area. In the seventh aspect, for example, by using a mean square error, a range in which this value is equal to or less than a certain value can be set as an error range, or a range in which a coefficient after passing through a high-pass filter is equal to or less than a certain value can be set as an error range.

Eighth Aspect

In the inferring apparatus according to an eighth aspect, the target data is image data. According to the eighth aspect, in the inferring process in which the image data is set as the target data, it is possible to prevent such problems that a computation amount increases, efficiency of a learning process decreases, and an inferring result does not have high accuracy.

Ninth Aspect

A learning apparatus according to a ninth aspect is a learning apparatus that learns a set value in a machine learning model based on learning data in which a value with respect to a one-dimensional or two-or-more dimensional space is represented as a discrete value at a sample point in the space. The learning apparatus includes an input unit (111) that receives an input of learning data, a predictable area determining unit (111a) that determines whether the learning data input to the input unit has a predictable area (a monochrome area, an area having no high-frequency component, a non-complicated area) in which there is low necessity of learning the set value, a machine learning model (112) to which data is input from the input unit, a learning process executing unit (101) that performs a process of learning a set value in a machine learning model to be learned based on learning data, by using the machine learning model to be learned, and a learning result storage unit (a storage unit 12) that stores therein the set value. The learning process executing unit outputs data required for inferring an area (data other than the predictable area in the image data of the first to third embodiments and the entire image data of the fourth embodiment), which is not a predictable area, to the machine learning model, but does not output at least a part of data required for inferring the predictable area to the machine learning model. According to the ninth aspect, there is an advantage in that a computation amount can be reduced as compared to a configuration in which the entire image data is uniformly output to the machine learning model.

Tenth Aspect

A learning apparatus according to a tenth aspect is a learning apparatus that learns a set value in a machine learning model based on learning data in which a value with respect to a one-dimensional or two-or-more dimensional space is expressed as a discrete value at a sample point in the space. The learning apparatus includes an input unit (111) that receives an input of learning data, a predictable area determining unit (111*a*) that determines whether the learning data input to the input unit has a predictable area (a monochrome area, an area having no high-frequency component, a non-complicated area) in which there is low necessity of learning the set value, a machine learning model (112) to which data is input from the input unit, a learning process executing unit (101) that performs a process of learning a set value in a machine learning model to be learned based on learning data, by using the machine learning model to be learned, a learning result storage unit (a storage unit 12) that stores therein the set value, and a data processing unit (a set image generating unit 113*a* according to the second embodiment) that performs predetermined data processing with respect to a data area, which is determined as a predictable area. The learning process executing unit outputs data required for inferring an area, which is not a predictable area, to the machine learning model. For example, as the predetermined data processing, an enlargement process of the predictable area, or light-load processing that does not take time in the processing by using the second machine learning model described in the third embodiment can be adopted. According to the tenth aspect, there is an advantage in that a computation amount can be reduced as compared to a configuration in which the entire image data is uniformly output to the machine learning model (the second machine learning model in the third embodiment).

Eleventh Aspect

The learning apparatus according to an eleventh aspect determines at least a part of an area having a same sample value continuous in the learning data as a predictable area. According to the eleventh aspect, a monochrome area can be determined as a predictable area.

Twelfth Aspect

In the learning apparatus according to a twelfth aspect, the predictable area determining unit has a high-frequency component determining unit that determines an area having no high-frequency component as a predictable area, based on high-frequency components in the learning data. According to the twelfth aspect, an area having no high-frequency component can be determined as a predictable area. The learning process executing unit may have a configuration of outputting the learning data including a predictable area to the machine learning model. According to this configuration, the machine learning model can be learned by the learning data including the predictable area.

Thirteenth Aspect

In the learning apparatus according to a thirteenth aspect, the learning data is image data. According to the thirteenth aspect, in the learning process using the image data as target data, it is possible to prevent such problems that a computation amount increases and efficiency of a learning process decreases.

Fourteenth Aspect

A computer program according to a fourteenth aspect is characterized such that a computer is caused to operate as the learning apparatus or the inferring apparatus described above. According to the fourteenth aspect, same effects as those of the learning apparatus or the inferring apparatus described above can be exerted.

Fifteenth Aspect

A computer system according to a fifteenth aspect is characterized such that the input data is transmitted to the learning apparatus or the inferring apparatus described above or the computer program described above, and the output data is received and used. According to the fifteenth aspect, same effects as those of the learning apparatus or the inferring apparatus described above can be exerted.

Sixteenth Aspect

An inferring method according to a sixteenth aspect is an inferring method for causing an inferring apparatus or a computer program to function to perform a predetermined inferring process with respect to data that represents a value with respect to a one-dimensional or two-or-more dimensional space as a discrete value at a sample point in the space, by using a machine learning model. The inferring method includes an input step of receiving an input of target data (S301 in FIG. 3, S401 in FIG. 4, S901 in FIG. 9, S1101 in FIG. 11, and S1301 in FIG. 13), a predictable area determining step of determining whether target data input at the input step has a predictable area in which an inferring result of the inferring process can be easily predicted (S302 in FIG. 3, S403 in FIG. 4, S902 in FIG. 9, S1103 in FIG. 11, and S1303 in FIG. 13), an inferring process executing step of performing a predetermined inferring process with respect to the target data by using the machine learning model to which data is input (S304 in FIG. 3, S408 in FIG. 4, S904 in FIG. 9, S1105 in FIG. 11, and S1308 in FIG. 13), and a predicted data generating step of performing predetermined data processing with respect to a data area, which is determined as the predictable area (S405 in FIG. 4, S1108 in FIG. 11, and S1305 in FIG. 13). At the inferring process executing step, data required for inferring an area, which is not a predictable area, is output to the machine learning model, and the data processing is performed in an average time shorter than that of the inferring process. According to the sixteenth aspect, same effects as those of the first aspect can be exerted.

Seventeenth Aspect

A learning method according to a seventeenth aspect is a learning method for causing a learning apparatus or a computer program to function to learn a set value in a machine learning model based on learning data, in which a value with respect to a one-dimensional or two-or-more dimensional space is represented as a discrete value at a sample point in the space. The learning method includes an input step of receiving an input of learning data (S501 in FIGS. 5 and S601 in FIG. 6), a predictable area determining step of determining whether the learning data input at the input step has a predictable area in which there is low necessity of learning the set value (S502 in FIGS. 5 and S603 in FIG. 6), a learning process executing step of performing a process of learning a set value in a machine learning model to be learned based on the learning data, by using the machine learning model to be learned (S502 in FIGS. 5 and S603 in FIG. 6), and a learning result storing step of storing the set value (S502 in FIGS. 5 and S603 in FIG. 6). At the learning process executing step, data required for inferring an area, which is not a predictable area, is output to the machine learning model (S503 in FIGS. 5 and S605 in FIG. 6), and at least a part of data required for inferring the predictable area is not output to the machine learning model. According to the seventeenth aspect, same effects as those of the ninth aspect can be exerted.

Eighteenth Aspect

A learning method according to an eighteenth aspect is a learning method for causing a learning apparatus or a computer program to function to learn a set value in a machine learning model based on learning data, in which a value with respect to a one-dimensional or two-or-more dimensional space is represented as a discrete value at a sample point in the space. The learning method includes an input step of receiving an input of learning data, a predictable area determining step of determining whether the learning data input at the input step has a predictable area in which there is low necessity of learning the set value, a learning process executing step of performing a process of learning a set value in a machine learning model to be learned based on the learning data, by using the machine learning model to be learned (a step of inputting the learning data to the first machine learning model 112 in the third embodiment), a learning result storing step of storing the set value, and a data processing step of performing predetermined data processing to a data area that is determined as the predictable area (a step of inputting a predictable area in the learning data to the set image generating unit 113a in the third embodiment). At the learning process executing step, data required for inferring an area, which is not a predictable area, is output to the machine learning model. According to the eighteenth aspect, same effects as those of the tenth aspect can be exerted.

REFERENCE SIGNS LIST 1 image processing apparatus (learning apparatus and inferring apparatus)
12 storage unit (learning result storage unit)
101 learning process executing unit
102 inferring process executing unit
111 input unit
111a predictable area determining unit
111b monochrome area determining unit
111c block dividing unit
111d high-frequency component determining unit
111e complexity determining unit
112 machine learning model (first machine learning model)
113 output unit
113a set image generating unit (predicted data generating unit)
113b image combining unit (data combining unit)
113c super-resolution processing (nearest neighbor interpolation, bi-linear interpolation, etc.) (second machine learning model)

What is claimed is:

1. An inferring apparatus that performs a predetermined inferring process with respect to data, in which a value with respect to a one-dimensional or two-or-more dimensional space in an image is represented as a discrete value at a sample point in the one-dimensional or two-or-more dimensional space in the image, by using a machine learning model, the inferring apparatus comprising:
an input unit that receives an input of target data;
a predictable area determining unit that determines whether target data input to the input unit has a predictable area in which an inferring result of the predetermined inferring process can be easily predicted;
a machine learning model to which data is input from the input unit;
an inferring process executing unit that performs a predetermined inferring process with respect to the target data by using the machine learning model; and
a predicted data generating unit that performs predetermined data processing with respect to a data area, which is determined to be the predictable area, wherein
the inferring process executing unit outputs data required for inferring an area, which is not a predictable area to the machine learning model, and
the predicted data generating unit performs the data processing in an average time shorter than that of the inferring process.

2. The inferring apparatus according to claim 1, wherein the inferring apparatus further comprises:
a data combining unit that combines target data processed in the machine learning model with data generated by the predicted data generating unit; and
an output unit that outputs data combined by the data combining unit.

3. The inferring apparatus according to claim 1, wherein the predictable area determining unit determines at least a part of areas having a same sample value continuous in the target data as a predictable area.

4. The inferring apparatus according to claim 2, wherein the predictable area determining unit determines at least a part of areas having a same sample value continuous in the target data as a predictable area.

5. The inferring apparatus according to claim 1, wherein the predictable area determining unit includes a high-frequency component determining unit that determines an area having no high-frequency component as a predictable area based on high-frequency components in the target data.

6. The inferring apparatus according to claim 2, wherein the predictable area determining unit includes a high-frequency component determining unit that determines an area having no high-frequency component as a predictable area based on high-frequency components in the target data.

7. A learning apparatus that learns a set value in a machine learning model based on learning data in which a value with respect to a one-dimensional or two-or-more dimensional space in an image is represented as a discrete value at a sample point in the one-dimensional or two-or-more dimensional space in the image, the learning apparatus comprising:
an input unit that receives an input of learning data;
a predictable area determining unit that determines whether learning data input to the input unit has a predictable area in which there is low necessity of learning the set value;

a machine learning model to which data is input from the input unit;

a learning process executing unit that performs a process of learning a set value in a machine learning model to be learned based on learning data, by using the machine learning model to be learned; and a learning result storage unit that stores therein the set value, wherein the learning process executing unit outputs data required for inferring an area, which is not a predictable area, to the machine learning model, and does not output at least a part of data required for inferring the predictable area to the machine learning model.

8. The learning apparatus according to claim 7, further comprising a data processing unit that performs predetermined data processing with respect to a data area, which is determined as a predictable area by the predictable area determining unit, wherein the learning process executing unit outputs data required for inferring an area, which is not a predictable area, to the machine learning model.

9. The learning apparatus according to claim 7, wherein the predictable area determining unit determines at least a part of an area having a same sample value continuous in the learning data as a predictable area.

10. The learning apparatus according to claim 8, wherein the predictable area determining unit determines at least a part of an area having a same sample value continuous in the learning data as a predictable area.

11. The learning apparatus according to claim 7, wherein the predictable area determining unit includes a high-frequency component determining unit that determines an area having no high-frequency component as a predictable area based on high-frequency components in the learning data.

12. The learning apparatus according to claim 8, wherein the predictable area determining unit includes a high-frequency component determining unit that determines an area having no high-frequency component as a predictable area based on high-frequency components in the learning data.

13. An inferring method for causing an inferring apparatus or a computer program to function to perform a predetermined inferring process with respect to data, in which a value with respect to a one-dimensional or two-or-more dimensional space in an image is represented as a discrete value at a sample point in the one-dimensional or two-or-more dimensional space in the image, by using a machine learning model, the inferring method comprising:

an input step of receiving an input of target data;

a predictable area determining step of determining whether the input of the target data at the input step has a predictable area in which an inferring result of the predetermined inferring process can be easily predicted;

an inferring process executing step of performing a predetermined inferring process with respect to the target data by using the machine learning model to which data is input; and a predicted data generating step of performing predetermined data processing with respect to a data area, which is determined as the predictable area, wherein at the inferring process executing step, data required for inferring an area, which is not a predictable area, is output to the machine learning model, and at the predicted data generating step, the data processing is performed in an average time shorter than that of the inferring process.

14. A learning method for causing a learning apparatus or a computer program to function to learn a set value in a machine learning model based on learning data, in which a value with respect to a one-dimensional or two-or-more dimensional space in an image is represented as a discrete value at a sample point in the one-dimensional or two-or-more dimensional space in the image, the learning method comprising:

an input step of receiving an input of learning data;

a predictable area determining step of determining whether the input of the learning data at the input step has a predictable area in which there is low necessity of learning the set value;

a learning process executing step of performing a process of learning a set value in a machine learning model as a target of learning based on the learning data, by using the machine learning model as the target of learning; and a learning result storing step of storing the set value, wherein at the learning process executing step, data required for inferring an area, which is not a predictable area, is output to the machine learning model, and at least a part of data required for inferring the predictable area is not output to the machine learning model.

* * * * *